(12) United States Patent
Sarangi et al.

(10) Patent No.: US 11,691,247 B2
(45) Date of Patent: Jul. 4, 2023

(54) BONDED ABRASIVE ARTICLES

(71) Applicants: SAINT-GOBAIN ABRASIVES, INC., Worcester, MA (US); SAINT-GOBAIN ABRASIFS, Conflans-Sainte-Honorine (FR)

(72) Inventors: Nilanjan Sarangi, Shrewsbury, MA (US); Guangyong Lin, Shrewsbury, MA (US); Sandhya Jayaraman Rukmani, Shrewsbury, MA (US); Stephen E. Fox, Worcester, MA (US); Daming Zhang, Shanghai (CN)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 620 days.

(21) Appl. No.: 16/235,785

(22) Filed: Dec. 28, 2018

(65) Prior Publication Data

US 2019/0210191 A1 Jul. 11, 2019

Related U.S. Application Data

(60) Provisional application No. 62/610,980, filed on Dec. 28, 2017.

(51) Int. Cl.
*B24D 3/06* (2006.01)
*C03C 14/00* (2006.01)
*C04B 35/00* (2006.01)

(52) U.S. Cl.
CPC .............. *B24D 3/06* (2013.01); *C03C 14/004* (2013.01); *C04B 35/00* (2013.01); *C03C 2214/04* (2013.01)

(58) Field of Classification Search
CPC ..... B24D 3/06; C03C 14/004; C03C 2214/04; C04B 35/00
See application file for complete search history.

(56) References Cited

U.S. PATENT DOCUMENTS

| 2,730,439 A | 1/1956 | Houchins |
| 4,224,380 A | 9/1980 | Bovenkerk et al. |

(Continued)

FOREIGN PATENT DOCUMENTS

| CN | 1205262 A | 1/1990 |
| CN | 1636046 A | 7/2005 |

(Continued)

OTHER PUBLICATIONS

International Search Report and Written Opinion in International Application No. PCT/US2018/067949 dated Apr. 3, 2019, 14 pgs.

(Continued)

*Primary Examiner* — Pegah Parvini
*Assistant Examiner* — Ross J Christie
(74) *Attorney, Agent, or Firm* — Abel Schillinger, LLP; Arpan Ghosh

(57) ABSTRACT

An abrasive article includes a body having a bond material extending throughout the body and abrasive particles contained in the bond material. The bond material can include aluminum oxide ($Al_2O_3$) and lithium oxide ($Li_2O$). In an embodiment, the bond material can include a ratio ($Al_2O_3$/$Li_2O$) of a content of aluminum oxide ($Al_2O_3$) relative to a content of lithium oxide ($Li_2O$), based on weight percent, of greater than 11.5 and at most 20. In another embodiment, the abrasive article can have a versatility factor of greater than 1.90.

19 Claims, 11 Drawing Sheets

(56) References Cited

U.S. PATENT DOCUMENTS

| | | |
|---|---|---|
| 4,288,248 A | 9/1981 | Bovenkerk et al. |
| 4,314,827 A | 2/1982 | Leitheiser et al. |
| 4,524,138 A | 6/1985 | Schwetz et al. |
| 4,543,107 A | 9/1985 | Rue |
| 4,623,364 A | 11/1986 | Cottringer et al. |
| 4,744,802 A | 5/1988 | Schwabel |
| 4,786,292 A | 11/1988 | Winkler et al. |
| 4,898,597 A | 2/1990 | Hay et al. |
| 5,035,723 A | 7/1991 | Kalinowski et al. |
| 5,090,970 A | 2/1992 | Rue et al. |
| 5,094,672 A | 3/1992 | Giles, Jr. et al. |
| 5,118,326 A | 6/1992 | Lee et al. |
| 5,129,919 A | 7/1992 | Kalinowski et al. |
| 5,131,923 A | 7/1992 | Markoff-Matheny et al. |
| 5,152,810 A | 10/1992 | Rue et al. |
| 5,185,299 A | 2/1993 | Wood et al. |
| 5,203,882 A | 4/1993 | Carman et al. |
| 5,203,886 A | 4/1993 | Sheldon et al. |
| 5,273,558 A | 12/1993 | Nelson et al. |
| 5,401,284 A | 3/1995 | Sheldon et al. |
| 5,536,283 A | 7/1996 | Sheldon et al. |
| 5,711,774 A | 1/1998 | Sheldon |
| 5,863,308 A | 1/1999 | Qi et al. |
| 6,066,189 A | 5/2000 | Meyer et al. |
| 6,074,278 A | 6/2000 | Wu et al. |
| 6,086,648 A | 7/2000 | Rossetti, Jr. et al. |
| 6,123,744 A | 9/2000 | Huzinec |
| 6,500,200 B1 | 12/2002 | Krueger et al. |
| 6,679,758 B2 | 1/2004 | Bright et al. |
| 6,702,867 B2 | 3/2004 | Carman et al. |
| 6,863,596 B2 | 3/2005 | Fritz et al. |
| 6,887,288 B2 | 5/2005 | Hokkirigawa et al. |
| 6,988,937 B2 | 1/2006 | Bonner et al. |
| 7,077,723 B2 | 7/2006 | Bright et al. |
| 7,275,980 B2 | 10/2007 | Bonner et al. |
| 7,422,513 B2 | 9/2008 | Bright et al. |
| 7,544,114 B2 | 6/2009 | Orlhac |
| 7,563,294 B2 | 7/2009 | Rosenflanz |
| 7,722,691 B2 | 5/2010 | Orlhac et al. |
| 8,043,393 B2 | 10/2011 | Querel et al. |
| 8,721,751 B2 * | 5/2014 | Querel ............... B24D 3/14 51/293 |
| 8,784,521 B2 | 7/2014 | Querel et al. |
| 9,144,885 B2 | 9/2015 | Sarangi et al. |
| 9,539,701 B2 | 1/2017 | Sarangi |
| 2002/0160694 A1 | 10/2002 | Wood et al. |
| 2003/0205003 A1 | 11/2003 | Carman et al. |
| 2006/0211342 A1 | 9/2006 | Bonner et al. |
| 2007/0074456 A1 | 4/2007 | Orlhac et al. |
| 2008/0066387 A1 | 3/2008 | Bonner et al. |
| 2008/0085660 A1 | 4/2008 | Orlhac |
| 2008/0222965 A1 | 9/2008 | Querel et al. |
| 2008/0222967 A1 | 9/2008 | Querel et al. |
| 2009/0068928 A1 | 3/2009 | Kumar et al. |
| 2010/0190424 A1 | 7/2010 | Francois et al. |
| 2010/0196700 A1 | 8/2010 | Orlhac et al. |
| 2011/0083374 A1 | 4/2011 | Querel et al. |
| 2011/0131889 A1 | 6/2011 | Querel et al. |
| 2012/0247027 A1 | 10/2012 | Sarangi et al. |
| 2013/0167448 A1 | 7/2013 | Sarangi et al. |
| 2014/0007516 A1 | 1/2014 | Papin et al. |
| 2014/0287658 A1* | 9/2014 | Flaschberger ........... B24D 3/14 451/47 |
| 2016/0151885 A1 | 6/2016 | Sarangi et al. |
| 2016/0186027 A1 | 6/2016 | Sarangi |
| 2017/0008153 A1 | 1/2017 | Sivasubramanian et al. |

FOREIGN PATENT DOCUMENTS

| | | |
|---|---|---|
| JP | H06-335866 A | 12/1994 |
| JP | 2001-521829 A | 11/2001 |
| JP | 2003-527974 A | 9/2003 |
| JP | 2004-510675 A | 4/2004 |
| JP | 2004-142085 A | 5/2004 |
| JP | 2005-138285 A | 6/2005 |
| JP | 2010-521326 A | 6/2010 |
| JP | 2011-131379 A | 7/2011 |
| JP | 2004-009195 A | 1/2015 |
| RU | 2012122509 A | 1/2014 |
| TW | 200718511 A | 5/2007 |
| WO | 99/22910 | 5/1999 |
| WO | 00/73022 A1 | 12/2000 |
| WO | 01/70463 A2 | 9/2001 |
| WO | 02/28980 A2 | 4/2002 |
| WO | 03/86703 A1 | 10/2003 |
| WO | 2005/097409 A1 | 10/2005 |
| WO | 2007/040865 A1 | 4/2007 |
| WO | 2008/079680 A1 | 7/2008 |
| WO | 2008/112899 A2 | 9/2008 |
| WO | 2008/112914 A2 | 9/2008 |
| WO | 2009/046091 A1 | 4/2009 |

OTHER PUBLICATIONS

International Search Report and Written Opinion in International Application No. PCT/US2012/031703 dated Oct. 23, 2012, 12 pgs.

International Search Report and Written Opinion in International Application No. PCT/US2012/031673 dated Oct. 10, 2012, 11 pgs.

* cited by examiner

BONDED ABRASIVE ARTICLES

CROSS-REFERENCE TO RELATED APPLICATION(S)

This application claims priority under 35 U.S.C. § 119(e) to U.S. Provisional Application No. 62/610,980 entitled "BONDED ABRASIVE ARTICLES," by Nilanjan SARANGI, Guangyong LIN, Sandhya JAYARAMAN RUKMANI, Stephen E. FOX, and Darning ZHANG, filed Dec. 28, 2017, which is assigned to the current assignee hereof and incorporated herein by reference in its entirety.

BACKGROUND

Field of the Disclosure

The following is directed to bonded abrasive articles, and particularly, to bonded abrasive articles including a vitrified bond material and improved versatility.

Description of the Related Art

Bonded abrasive articles, such as abrasive wheels, can be used for cutting, grinding, or shaping various materials. Performance of bonded abrasive articles can vary when used in different applications. For instance, a grinding wheel suitable for grinding a carbon steel workpiece may not provide satisfactory performance for grinding a chrome steel workpiece. The industry continues to demand improved bonded abrasive articles that can be suitable for more than one application.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
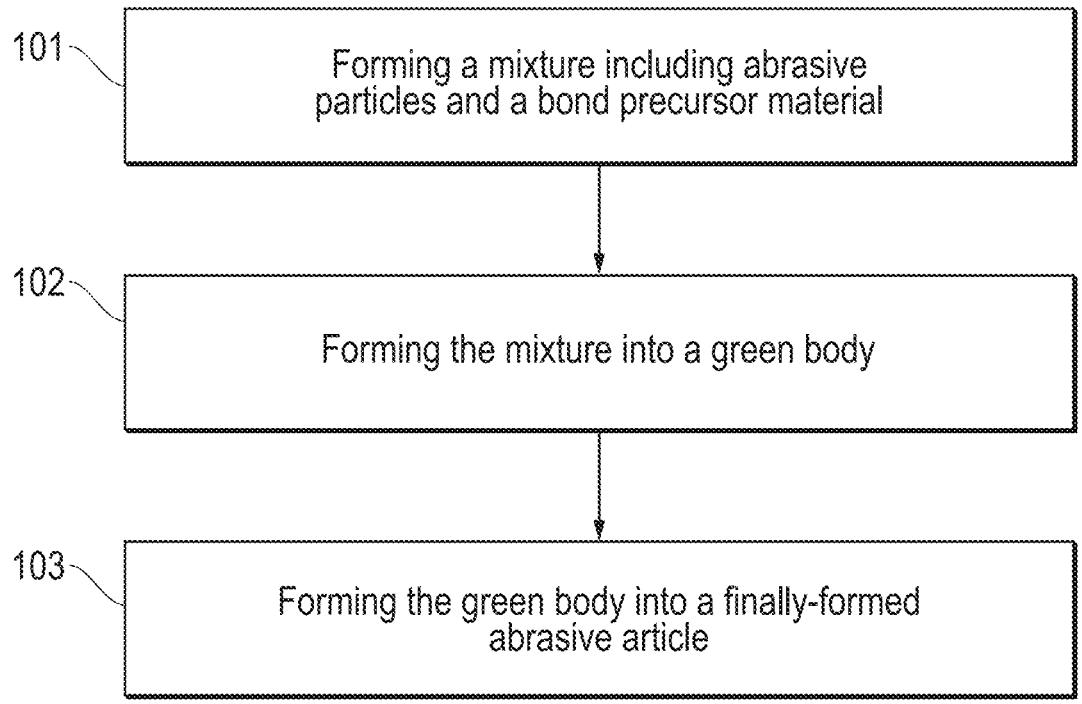
FIG. 1 includes a flow chart illustrating a process of forming an abrasive article according to an embodiment.

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are directed to bonded abrasive articles with improved versatility, which can allow the same abrasive articles to be suitable for grinding and shaping various types of workpieces under different grinding conditions (e.g., wheel speeds or material removal rates). According to an embodiment, the abrasive articles can include an inorganic bond material, such as a vitreous bond material, and abrasive particles contained within the bond material. The bond material can include a particular ratio of a content of alumina ($Al_2O_3$) to a content of lithium oxide ($Li_2O$) based on weight, which can help to form an improved microstructure, which may in turn facilitate improved versatility of the abrasive articles.

The abrasive articles described in embodiments herein can be suitable for various grinding operations including for example, centerless grinding, cylindrical grinding, crankshaft grinding, various surface grinding operations, bearing and gear grinding operations, creepfeed grinding, and various toolroom applications.

FIG. 1 includes a flowchart illustrating a process of forming an abrasive article in accordance with an embodiment. As illustrated, at step 101, the process can be initiated by forming a mixture including abrasive particles and a bond material or bond precursor material.

In an embodiment, the abrasive particles can include a material selected from the group of oxides, nitrides, carbides, borides, silicates, superabrasives, minerals, monocrystalline, polycrystalline, amorphous, or a combination thereof. For example, the abrasive particles can include SiC. In another embodiment, the abrasive particles can include alumina ($Al_2O_3$), such as microcrystalline alumina (e.g., sol-gel alumina), nanocrystalline alumina, fused alumina, or the like. In another embodiment, the abrasive particles can include white alumina. In a particular embodiment, a majority of the abrasive particles can include alumina, and more particularly, the abrasive particles can consist essentially of alumina.

In accordance with an embodiment, the abrasive particles can include unagglomerated abrasive particles, agglomerated abrasive particles, or a combination thereof. In a particular embodiment, a majority of the abrasive particles can be unagglomerated abrasive particles, or more particularly, the abrasive particles can consist essentially of unagglomerated abrasive particles. According to further embodiment, the abrasive particles can have a certain average particle size (D50), which can facilitate improved formation and/or performance of the abrasive article. For instance, the abrasive particles can have an average particle size (D50) of at least 0.1 microns, such as at least 1 micron, at least 5 microns, at least 10 microns, at least 20 microns, at least 30 microns, at least 40 microns or even at least 50 microns. Still, in another non-limiting embodiment, the abrasive particles can have an average particle size (D50) of at most 2600 microns or at most 2550 microns or at most 2500 microns or at most 2300 microns or at most 2000 microns or at most 1800 microns or at most 1500 microns or at most 1200 microns or at most 1000 microns or at most 800 microns or at most 600 microns or at most 300 microns or at most 200 microns or at most 150 microns or at most 100 microns. It will be appreciated that the abrasive particles can have an average particle size within a range including any of the minimum and maximum values noted above.

The bond material or bond precursor material may include a powder material that may form the bond material of the finally-formed abrasive particle. In one embodiment, the bond precursor material can include a frit. In another embodiment, the bond precursor material can include an inorganic material, such as a ceramic material, a carbonate, minerals, inorganic compounds, or any combination thereof. As used herein, a reference to a ceramic can include a composition including at least one metal element and at least one non-metal element. For example, a ceramic may include material such as oxides, carbides, nitrides, borides, and a combination thereof. In still another embodiment, the bond precursor material can include an oxide-based composition, which may include some content of silica (i.e., silicon dioxide), boron oxide, alumina (i.e., aluminum oxide), lithium oxide, sodium oxide, potassium oxide, iron oxide, titanium oxide, magnesium oxide, calcium oxide, or the like. Contents of the bond material of the finally-formed bonded abrasive body are described in more details later in this disclosure. The composition of the bond precursor material and the bond material of the finally-formed bonded abrasive body can be substantially the same (i.e., 5% or less difference in any one of the components between the precursor bond material and bond material of the finally-formed bonded abrasive body) or essentially the same (i.e., 1% or less difference in any one of the components between the precursor bond material and bond material of the finally-formed bonded abrasive body).

The bond precursor material can have a particular melting temperature that may facilitate suitable formation and performance of the abrasive article. In at least one embodiment, the bond precursor material can have a melting temperature that is at least 800° C., such as at least 825° C. or at least 850° C. or at least 875° C. or at least 900° C. Still, in one non-limiting embodiment the melting temperature of the bond precursor material can be at most 1050° C., such as most 1000° C. or at most 950° C. or at most 935° C. or at most 925° C. It will be appreciated that the melting temperature can be within a range including any of the minimum and maximum temperatures noted above. For instance, the melting temperature of the bond precursor material can be in a range including at least 850° C. and at most 1000° C. or in a range including at least 900° C. and at most 925° C.

In some applications, secondary particles, such as a filler material, secondary abrasive particle, or both can be added to the mixture including the bond precursor material and abrasive particles. The filler material can be distinct from the abrasive particles and may have a hardness less than a hardness of the abrasive particles. The filler material may provide improved mechanical properties and facilitate formation of the abrasive article. The filler material may also be distinct from compositions contained within bond precursor material. In at least one embodiment, the filler material can include various materials, such as fibers, woven materials, non-woven materials, particles, minerals, nuts, shells, oxides, alumina, carbide, nitrides, borides, organic materials, polymeric materials, naturally occurring materials, and a combination thereof. In particular instances, the filler material can include a material such as wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), cryolite, glass, glass fibers, titanates (e.g., potassium titanate fibers), zircon, rock wool, clay, sepiolite, an iron sulfide (e.g., $Fe_2S_3$, $FeS_2$, or a combination thereof), fluorspar ($CaF_2$), potassium sulfate ($K_2SO_4$), graphite, potassium fluoroborate ($KBF_4$), potassium aluminum fluoride ($KAlF_4$), zinc sulfide (ZnS), zinc borate, borax, boric acid, fine alundum powders, $P_{15}A$, bubbled alumina, cork, glass spheres, silver, Saran™ resin, paradichlorobenzene, oxalic acid, alkali halides, organic halides, and attapulgite.

In certain instances, the secondary particles can include secondary abrasive particle including a material such as an oxide, a carbide, a nitride, a boride, a carbon-based material (e.g., diamond), an oxycarbide, an oxynitride, an oxyboride, or any combination thereof. In certain instances, the secondary abrasive particle can be particularly hard, having for example, a Mohs hardness of at least 6, such as at least 6.5, at least 7, at least 8, at least 8.5, at least 9. According to one embodiment, the secondary abrasive particles can include a superabrasive material. The secondary abrasive particles can include a material selected from the group of silicon dioxide, silicon carbide, alumina, zirconia, flint, garnet, emery, rare earth oxides, rare earth-containing materials, cerium oxide, sol-gel derived particles, gypsum, iron oxide, glass-containing particles, and a combination thereof. In another instance, secondary abrasive particle may also include silicon carbide (e.g., Green 39C and Black 37C), brown fused alumina (57A), seeded gel abrasive, sintered alumina with additives, shaped and sintered aluminum oxide, pink alumina, ruby alumina (e.g., 25A and 86A), electrofused monocrystalline alumina 32A, MA88, alumina zirconia abrasives (NZ, NV, ZF), extruded bauxite, cubic boron nitride, diamond, abral (aluminum oxy-nitride), sintered alumina (Treibacher's CCCSK), extruded alumina (e.g., SR1, TG, and TGII), or any combination thereof. The secondary abrasive particles may be diluent grains, having a hardness less than the abrasive particles, but still harder than filler materials that may be present in the abrasive article. In still other instances, the secondary abrasive particles may include shaped abrasive particles, which unlike crushed grains, each of the shaped abrasive particles can have a precise and substantially similar shape relative to each other.

Formation of the mixture can include forming a dry or wet mixture. It may be suitable to create a wet mixture to facilitate suitable dispersion of the abrasive particles within the bond precursor material. Moreover, it will be appreciated that the mixture can include other materials, including for example additives, binders, and any other materials known in the art to facilitate formation of a mixture to create a green product prior to formation of the abrasive article. In at least one embodiment, the mixture can be essentially free of a pore former.

Referring again to FIG. 1, after forming the mixture, the process can continue at step 102 forming the mixture into a green body. The process of forming the mixture into a green body can include pressing, molding, casting, cutting, printing, curing, depositing, drying, heating, cooling, or any combination thereof.

Referring again to FIG. 1, after forming the green body at step 102, the process can continue at step 103 by forming the green body into the finally-formed abrasive article. In certain instances, the process of forming the green body and the process for forming the finally-formed abrasive article can be combined, such that the mixture is converted directly to the finally-formed abrasive article. Suitable processes for forming the finally-formed abrasive article can include pressing, molding, casting, cutting, printing, curing, depositing, drying, heating, cooling, or any combination thereof.

In accordance with an embodiment, the process can include applying a temperature to the mixture or the green body to form the finally-formed abrasive article. In one particular embodiment, the temperature can be sufficient to form a vitreous bond material from the bond precursor material. In another embodiment, heating can be performed at a forming temperature of the bond material, such as at most 1100° C., such as at most 1050° C., at most 950° C., at most 925° C. or even at most 915° C. In another instance, heating can be performed at a temperature of at least 850° C., such as at least 875° C., or at least 900° C. It will be appreciated that the forming temperature can be within a range including any of the minimum and maximum values noted above. The forming temperature can be at or above the melting temperature of the bond precursor material.

Heating can be conducted in a suitable atmosphere. In an embodiment, the mixture can be heated in a non-oxidizing atmosphere, such as a nitrogen-rich atmosphere, and more particularly, in an atmosphere that consists essentially of nitrogen. In another embodiment, a non-oxidizing atmosphere can include one or more noble gases. Still, in another embodiment, heating can be performed in an ambient atmosphere (i.e., air).

After forming, the bonded abrasive body may be incorporated into an abrasive article. It will be appreciated that the bonded abrasive body may have any suitable size and shape as known in the art and can be incorporated into various types of abrasive articles to form a bonded abrasive article. For example, the bonded abrasive body can be attached to a substrate, such as a hub of a wheel to facilitate formation of a bonded abrasive grinding wheel.

Figure 2:
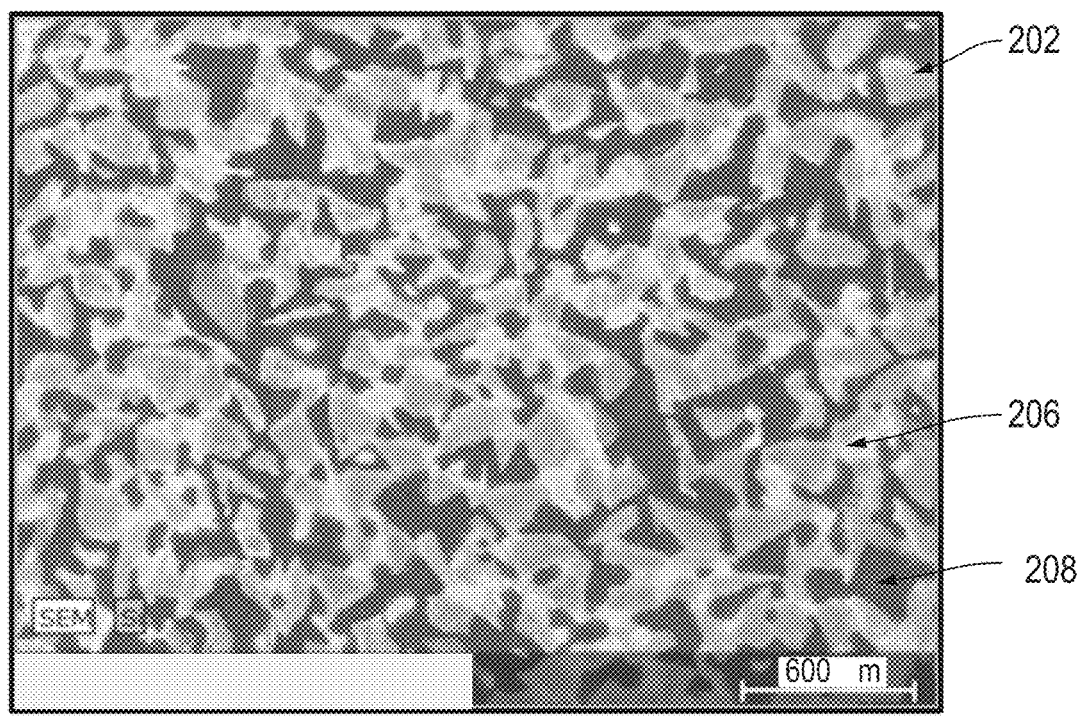
FIG. 2 includes an image of a cross section of an abrasive article according to an embodiment.

According to an embodiment, the abrasive article can include a body including a vitreous bond material extending throughout the body. FIG. 2 includes a scanning electron microscopic image of a cross section of a bonded body 200. As noted in FIG. 2, the abrasive article can have a body 200 in the form of a bonded abrasive including abrasive particles 202, bond material 206 in the form of bond bridges joining the abrasive particles 202, and pores 208 extending between the bond material 206 and abrasive particles 202.

The bonded abrasive body may include a certain content of the bond material that may facilitate improved performance of the abrasive article. In accordance with an embodiment, the body including at least 3 vol % bond material for a total volume of the body. In still other embodiments, the bonded abrasive body can include at least 4 vol % bond material, such as at least 5 vol % or at least 6 vol % or at least 7 vol % or at least 8 vol % or at least 8.5 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % bond material for a total volume of the body. In yet another non-limiting embodiment, the body of the bonded abrasive can have at most 35 vol % bond material for the total volume of the body, such as at most 33 vol % or at most 30 vol % or at most 29 vol % or at most 28 vol % or at most 27 vol % or at most 26 vol % or at most 25 vol % or at most 24 vol % or at most 23 vol % or at most 22 vol % or at most 20 vol % or at most 19 vol % or at most 18 vol % or at most 17 vol % or at most 16 vol % or at most 15 vol % or at most 14 vol % or at most 13.5 vol % or at most 13 vol % or at most 12 vol % or at most 11 vol % or at most 10 vol % or at most 9 vol % or at most 8 vol % or at most 7 vol % or at most 6 vol % or at most 5 vol % or at most 4 vol % bond material for a total volume of the body. It will be appreciated that the bonded abrasive body can have a bond material content within a range including any of the minimum and maximum percentages noted above.

In an embodiment, for a certain amount of bond material, the body can include a particular number of bond bridges that can facilitate improved performance of the abrasive article. In an aspect, when the body includes the bond material in a range from at least 3 vol % to less than 9 vol % for the total volume of the body, the body can include at least 110 bond bridges, such as at least 110 bond bridges, such as at least 112 bond bridges, or at least 115 bond bridges. In another aspect, when the body includes the bond material in a range from at least 3 vol % to less than 9 vol % for the total volume of the body, the body can include at most 145 bond bridges, such as at most 140 bond bridges, at most 135 bond bridges, or at most 125 bond bridges. In a further aspect, when the body includes the bond material in a range from at least 3 vol % to less than 9 vol % for the total volume of the body, the body can include bond bridges in a range including any of the minimum and maximum values noted herein. For instance, when the body includes the bond material in a range from at least 3 vol % to less than 9 vol % for the total volume of the body, the body can include bond bridges in a range including at least 110 and at most 145. It is to be understood that when the body includes the bond material in a range that is in the range from 3 vol % to less than 9 vol %, the body can include any number of bond bridges noted herein. For instance, when the body includes the bond material in a range from 3 vol % to 8.5 vol % or in a range from 4 vol % to 8.1 vol % for the total volume of the body, the body can include any number of bond bridges noted herein, such as in a range from at least 110 to at most 145 or in a range from at least 112 to at most 140.

As used herein, the number of bond bridges in the body can be determined as follows. A cross section of the body of an abrasive tool can be polished using a Buehler machine with $Al_2O_3$ aqueous solution followed by diamond paste. High-contrasting scanning electron microscope (i.e., Hitachi™ 3030 Plus) images of the entire cross section are taken under the magnification of 30×. Usually at least 4 to 6 images are needed for the entire cross section. Following the instructions of Bruker Quantax 75 EDS, silicon mapping is performed on the high-contrasting images to illuminate the bond material and obtain images similar to FIG. 2. Images demonstrating only the bond material are also provided by Bruker Quantax 75 EDS and used for subsequent analysis with ImageJ (i.e., version of 1.51q, published on Sep. 18, 2017), provided by the National Institutes of Health, to determine the number of bond bridges. All the images of the entire cross section are analyzed to establish statistical confidence of the number of the bond bridges. Newer versions of ImageJ that can allow the analysis to be performed in the same manner as follows can also be used, such as the version of 1.52e published on Jul. 11, 2018.

Figure 4:
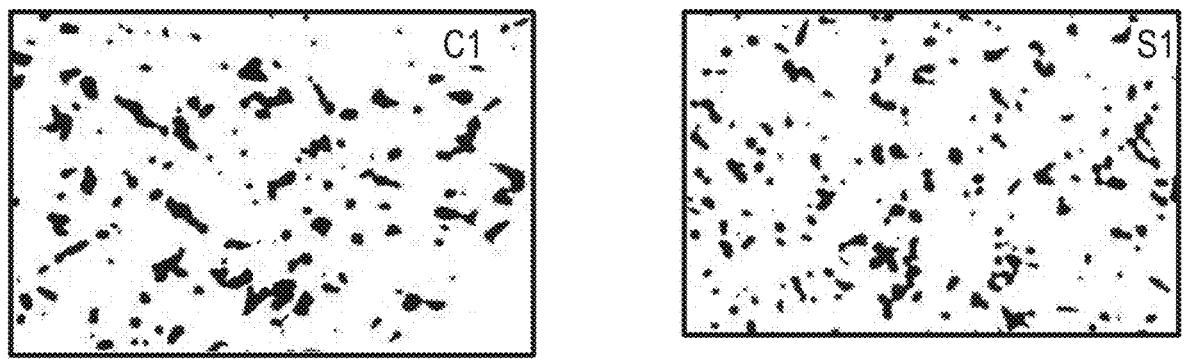
FIG. 4 includes images of cross sections of different abrasive articles.

Analysis is performed in the 8-bit setting, and the threshold can be set such that the percentage of the highlighted areas is as close as possible (e.g., to the extent allowed by ImageJ) to the actual content (vol %) of the bond material in the body. Images similar to FIG. 4 can then be obtained and used for determining the number of bond bridges. FIG. 4 includes an image of a cross section of the body of a conventional abrasive article sample, C1, and a cross section of the body of a representative sample, S1, of an embodiment. Bond bridges are shown in black and abrasive particles and pores are not visible. The average of the total number of bond bridges of all the analyzed cross-sectional images is used as the number of bond bridges of the body in this disclosure. For instance, if 4 images are analyzed and have N1, N2, N3, N4 bond bridges, respectively, the number of the bond bridges of the body is N, wherein N=(N1+N2+N3+N4)/4.

In a further aspect, when the body includes the bond material from at least 9 vol % to less than 14 vol %, the body can include at least 140 bond bridges, such as at least 145 bond bridges, at least 150 bond bridges, at least 152 bond bridges, at least 155 bond bridges, at least 160 bond bridges, at least 162 bond bridges, or at least 165 bond bridges. In a further aspect, when the body includes the bond material from at least 9 vol % to less than 14 vol %, the body can include at most 180 bond bridges, at most 175 bond bridges, at most 172 bond bridges, at most 170 bond bridges, or at most 168 bond bridges. In a further aspect, when the body includes the bond material in a range from at least 9 vol % to less than 14 vol % for the total volume of the body, the body can include bond bridges in a range including any of the minimum and maximum values noted herein. For instance, when the body includes the bond material in a range from at least 9 vol % to less than 14 vol % for the total volume of the body, the body can include bond bridges in a range including at least 140 and at most 180 bond bridges. It is to be understood that when the body includes the bond material in a range that is in the range at least 9 vol % to less than 14 vol %, such as in a range from 9 vol % to 13 vol % or in a range from 9 vol % to 12 vol % or in a range from 9 vol % to 11 vol % or in a range from 9 vol % to 10.5 vol %, the body can include any number of bond bridges noted herein. For instance, when the body includes the bond material in a range from 9 vol % to 13 vol % for the total volume of the body, the body can include any number of bond bridges noted herein, such as in a range from at least 140 to at most 180 or in a range from at least 152 to at most 180. In another instance, when the body includes the bond material in a range from 9 vol % to 12 vol % for the total volume of the body, the body can include any number of bond bridges noted herein, such as in a range from at least 140 to at most 180 or in a range from at least 152 to at most 180. In still another instance, when the body includes the bond material in a range from 9 vol % to 11 vol % for the total volume of the body, the body can include any number of bond bridges noted herein, such as in a range from at least 140 to at most 180 or in a range from at least 152 to at most 180. In still another instance, when the body includes the bond material in a range from 9 vol % to 10.5 vol % for the total volume of the body, the body can include any number of bond bridges noted herein, such as in a range from at least 140 to at most 180 or in a range from at least 152 to at most 180.

In a further aspect, when the body includes the bond material of at least 14 vol %, the body can include at least 130 bond bridges, such as at least 140 bond bridges, or at least 145 bond bridges. In a further aspect, when the body includes the bond material of at least 14 vol %, the body can include at most 160 bond bridges, at most 155 bond bridges, at most 150 bond bridges, or at most 148 bond bridges. In a further aspect, when the body includes the bond material of at least 14 vol % for the total volume of the body, the body can include bond bridges in a range including any of the minimum and maximum values noted herein. For instance, when the body includes the bond material of at most 14 vol % for the total volume of the body, the body can include bond bridges in a range including at least 130 and at most 160 bond bridges. It is to be understood that when the body includes the bond material in a range that is in the range of at least 14 vol %, such as in a range from 14 vol % to 25 vol % or in a range from 14 vol % to 20 vol %, the body can include any number of bond bridges noted herein. For instance, when the body includes the bond material in a range from 14 vol % to 25 vol % for the total volume of the body, the body can include any number of bond bridges noted herein, such as in a range from at least 130 to at most 160 or in a range from at least 140 to at most 150.

The bond material of the abrasive article may have a particular bond chemistry that may facilitate improved manufacturing and performance of the abrasive article. For example, the bond material can be a vitreous material including oxides, such as alumina ($Al_2O_3$), an alkali metal oxide, an alkaline earth metal oxide, boron oxide, silicon oxide, or any combination thereof. In one embodiment, the bond material can be essentially free of zircon ($ZrSiO_4$). In another embodiment, the bond material can have an amorphous phase. In one particular embodiment, the bond material can be essentially free of a crystalline phase. In another particular embodiment, the bond material can consist essentially of a vitreous material. As used herein, the term, essentially free of, when used in reference to a component of the body or a component of the bond material, such as a compound, is intended to mean the component is present in a content of less than 1 wt %, and may be less than 0.1 wt % for the total weight of the body or the bond material.

In accordance with an embodiment, the bond material can include alumina ($Al_2O_3$). The alumina can be present in a certain content that can facilitate improved formation and performance of the abrasive article. For instance, the content of alumina ($Al_2O_3$) can be greater than 23 wt % for a total weight of the bond material, such as at least 23.5 wt % or at least 24.0 wt % or at least 24.5 wt % or at least 24.8 wt % or at least 25.0 wt % or at least 25.5 wt % or at least 26.0 wt % or at least 26.5 wt % for a total weight of the bond material. In another instance, the bond material can include alumina ($Al_2O_3$) of at most 35 wt % for a total weight of the bond material, such as at most 34 wt % or at most 33 wt % or at most 32 wt % or at most 31 wt % or at most 30 wt % or at most 29 wt % or at most 28 wt % or at most 27 wt % for a total weight of the bond material. Moreover, the content of the alumina ($Al_2O_3$) can be within a range including any of the minimum and maximum values disclosed herein. For instance, the bond material can include alumina ($Al_2O_3$) in a range from greater than 23 wt % to 35 wt %, or in a range from 23.5 wt % to 33 wt % or in a range from 25 wt % to 30 wt %.

According to an embodiment, the bond material can include lithium oxide ($Li_2O$). The lithium oxide ($Li_2O$) can be present in a certain content that can facilitate improved formation and performance of the abrasive article. For instance, the content of lithium oxide ($Li_2O$) can be at most at most 3.5 wt % for the total weight of the bond material or at most 3.4 wt % or at most 3.3 wt % or at most 3.1 wt % or at most 2.9 wt % or at most 2.6 wt % or at most 2.3 wt % or at most 2 wt % or at most 1.7 wt % for a total weight of the bond material. Alternatively or additionally, the content of lithium oxide ($Li_2O$) of at least 0.1 wt % for the total weight of the bond material or at least 0.2 wt % or at least 0.3 wt % or at least 0.5 wt % or at least 0.6 wt % or at least 0.8 wt % or at least 0.9 wt % or at least 1.1 wt % or at least 1.2 wt % or at least 1.4 wt % or at least 1.7 wt % for a total weight of the bond material. Moreover, the content of lithium oxide ($Li_2O$) can be within a range including any of the minimum and maximum values disclosed herein. For instance, the bond material can include lithium oxide ($Li_2O$) in a range from at least 0.1 wt % to at most 3.4 wt %.

In accordance with another embodiment, the bonded abrasive body can include a particular ratio of a content of alumina relative to the content of lithium oxide, such that the bond material includes a ratio ($Al_2O_3/Li_2O$) based on weight percent. Such a ratio may facilitate improved formation and performance of the abrasive article. In one embodiment, the ratio ($Al_2O_3/Li_2O$) can be at most 20.0 or at most 19.5 or at most 19.0 or at most 18.5 or at most 18.0 or at most 17.5 or at most 17.3 or at most 17.0 or at most 16.5 or at most 16.2 or at most 16.0 or at most 15.8 or at most 15.5 or at most 15.0 or at most 14.8. In another embodiment, the ratio ($Al_2O_3/Li_2O$) can be greater than 11.5 or at least 11.7 or at least 12.0 or at least 12.2 or at least 12.5 or at least 12.8 or at least 13.0 or at least 13.3 or at least 13.5 or at least 13.7 or at least 13.8 or at least 13.9 or at least 14.1 or at least 14.2 or at least 14.5 or at least 14.7 or at least 14.9 or at least 15.1 or at least 15.3 or at least 15.5 or at least 15.7 or at least 16.0 or at least 16.3 or at least 16.5 or at least 16.8 or at least 17.0 or at least 17.5. Moreover, the ratio ($Al_2O_3/Li_2O$) can be in a range including any of the minimum and maximum values noted herein. For instance, the ratio ($Al_2O_3/Li_2O$) can be in a range from greater than 11.5 to at most 20.0.

In accordance with an embodiment, the bond material can include a certain content of boron oxide ($B_2O_3$) that may facilitate formation of the abrasive article and improve performance. For example, the bond material may include at least 9 wt % of boron oxide ($B_2O_3$), such as at least 10 wt % or at least 11 wt % or at least 12 wt % or at least 13 wt % or at least 14 wt % or at least 16 wt % or at least 17 wt % or at least 18 wt % for a total weight of the bond material. Still, in at least one non-limiting embodiment, the bond material may include at most 32 wt % boron oxide ($B_2O_3$) for a total weight of the bond material, such as at most 30 wt % or at most 29 wt % or at most 28 wt % or at most 27 wt % or at most 26 wt % or at most 25 wt % or at most 23 wt % or at most 22 wt % or at most 21 wt % or at most 20 wt % or at most 19 wt % or at most 18 wt % or at most 17 wt % or at most 16 wt % or at most 15 wt % for a total weight of the bond material. It will be appreciated that the bond material can include a content of boron oxide within range including any of the minimum and maximum percentages noted above.

According to another embodiment, the bond material may include a certain ratio of a content of alumina relative to the content of boron oxide, such that the bond material includes a ratio ($Al_2O_3/B_2O_3$) based on weight percent. Such a ratio may facilitate improved formation and/or performance of the abrasive article. In one embodiment, the ratio ($Al_2O_3/B_2O_3$) can be at least 1.2 or at least 1.3 or at least 1.4 or at least 1.5 or at least 1.6 or at least 1.7 or at least 1.8. In another embodiment, the ratio ($Al_2O_3/B_2O_3$) can be at most 2.7 or at most 2.5 or at most 2.4 or at most 2.2 or at most 2.0 or at most 1.9 or at most 1.8 or at most 1.7. Moreover, the ratio ($Al_2O_3/B_2O_3$) can be in a range including any of the minimum and maximum values noted herein. For instance, the ratio ($Al_2O_3/B_2O_3$) can be in a range at least 1.2 to at most 2.7.

In accordance with an embodiment, the bond material can include a certain content of silicon dioxide ($SiO_2$) that may facilitate formation of the abrasive article and improve performance. For example, the bond material may include at least 30 wt % silicon dioxide ($SiO_2$), such as at least 32 wt % or at least 35 wt % or at least 37 wt % or at least 40 wt % or at least 42 wt % or at least 45 wt % or at least 47 wt % or at least 50 wt % or at least 52 wt % for a total weight of the bond material. Still, in at least one non-limiting embodiment, the bond material may include at most 65 wt % silicon dioxide ($SiO_2$) for a total weight of the bond material, such as at most 63 wt % or at most 60 wt % or at most 58 wt % or at most 56 wt % or at most 54 wt % or at most 52 wt % or at most 50 wt % or at most 48 wt % or at most 46 wt % for a total weight of the bond material. It will be appreciated that the bond material can include a content of silicon dioxide within range including any of the minimum and maximum percentages noted above.

In still another embodiment, the bond material may include a certain ratio of a content of alumina relative to the content of silicon dioxide, such that the bond material comprises a ratio a ratio ($Al_2O_3/SiO_2$), based on weight percent. Such a ratio may facilitate improved formation and/or performance of the abrasive article. In one embodiment the ratio ($Al_2O_3/SiO_2$) can be at least 0.35 or at least 0.38 or at least 0.39 or at least 0.40 or at least 0.41 or at least 0.43 or at least 0.45 or at least 0.47 or at least 0.48 or at least 0.49 or at least 0.50 or at least 0.52 or at least 0.53 or at least 0.54 or at least 0.55 or at least 0.60. In another embodiment, the ratio ($Al_2O_3/SiO_2$) can be at most 1.0 or at most 0.95 or at most 0.90 or at most 0.85 or at most 0.80 or at most 0.75 or at most 0.70 or at most 0.67 or at most 0.65 or at most 0.64 or at most 0.62 or at most 0.61 or at most 0.60 or at most 0.58. Moreover, the ratio ($Al_2O_3/SiO_2$) can be in a range including any of the minimum and maximum values noted herein. For instance, the ratio ($Al_2O_3/SiO_2$) can be in a range at least 0.36 to at most 1.0.

In another embodiment, the bond material may include a certain ratio of a content of boron oxide relative to the content of silicon dioxide, such that the bond material comprises a ratio ($B_2O_3/SiO_2$), based on weight percent. Such a ratio may facilitate improved formation and/or performance of the abrasive article. In one embodiment the ratio ($B_2O_3/SiO_2$) can be at most 0.8 or at most 0.7 or at most 0.6 or at most 0.5 or at most 0.4 or at most 0.35. Still, in one non-limiting embodiment, the ratio ($B_2O_3/SiO_2$) can be at least at least 0.10 or at least 0.15 or at least 0.18 or at least 0.19 or at least 0.20 or at least 0.22 or at least 0.24 or at least 0.25 or at least 0.26 or at least 0.27 or at least 0.28 or at least 0.29 or at least 0.3. It will be appreciated that the ratio ($B_2O_3/SiO_2$) can be within range including any of the minimum and maximum values noted above.

According to another aspect, the bond material can include a certain content of sodium oxide ($Na_2O$), which may facilitate suitable formation and performance of the abrasive article. For example, the bond material can include at least 0.5 wt % sodium oxide ($Na_2O$) for a total weight of the bond material. In another embodiment, the bond material can include at least 1 wt % sodium oxide for a total weight to of the bond material, such as at least 2 wt % or at least 3 wt % or at least 4 wt % or at least 5 wt % or at least 6 wt % or at least 7 wt % or at least 8 wt %. In another non-limiting embodiment, the bond material can include at most 15 wt % sodium oxide ($Na_2O$) for a total weight of the bond material, such as at most 14 wt % or at most 13 wt % or at most 12 wt % or at most 11 wt % or at most 10 wt % or at most 9 wt % or at most 8.5 wt % for the total weight of the bond material. It will be appreciated that the bond material can include a content of sodium oxide within range including any of the minimum and maximum percentages noted above.

According to another aspect, the bond material can include a particular content of potassium oxide ($K_2O$), which may facilitate suitable formation and performance of the abrasive article. For example, the bond material can include at least 0.3 wt % potassium oxide ($K_2O$) for a total weight of the bond material or at least 0.5 wt % or at least 0.8 wt % or at least 1.2 wt % or at least 1.7 wt % or at least 2.0 wt % or at least 2.5 wt %. In another non-limiting embodiment, the bond material can include at most 7.5 wt % potassium oxide ($K_2O$) for a total weight of the bond material or at most 7.0 wt % or at most 6.5 wt % or at most 6.0 wt % or at most 5.5 wt % or at most 5.0 wt % or at most 4.5 wt % or at most 4 wt % or at most 3.5 wt % or at most 3.0 wt % for the total weight of the bond material. It will be appreciated that the bond material can include a content of potassium oxide within range including any of the minimum and maximum percentages noted above.

In another embodiment, the bond material can include a content of certain components that facilitates suitable formation and/or performance of the abrasive article. Such components can include manganese dioxide ($MnO_2$), magnesium oxide (MgO), calcium oxide (CaO), iron oxide ($Fe_2O_3$), titanium dioxide ($TiO_2$), barium oxide (BaO), zinc oxide (ZnO), phosphorous oxide ($P_2O_5$), zirconium oxide ($ZrO_2$), or any combination thereof. For example, in one instance, the bond material can include at most 2.0 wt % for the total weight of the bond of any one of manganese dioxide ($MnO_2$), magnesium oxide (MgO), calcium oxide (CaO), iron oxide ($Fe_2O_3$), titanium dioxide ($TiO_2$), barium oxide (BaO), phosphorous oxide ($P_2O_5$), zirconium oxide ($ZrO_2$), or zinc oxide (ZnO). In another embodiment, the bond material can include at most 1 wt % or even not greater than 0.5 wt % of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), or titanium dioxide ($TiO_2$). In one embodiment, the bond material can be essentially free of any one of or combination of manganese dioxide ($MnO_2$), magnesium oxide (MgO), calcium oxide (CaO), barium oxide (BaO), zinc oxide (ZnO), iron oxide ($Fe_2O_3$), phosphorous oxide ($P_2O_5$), zirconium oxide ($ZrO_2$), or titanium dioxide ($TiO_2$).

In accordance with another embodiment, the bonded abrasive body may have a certain content of porosity and type of porosity that may facilitate improved performance of the abrasive article. In accordance with an embodiment the body can include at least 15 vol % porosity for a total volume of the body. In a more particular embodiment, the body can include at least 16 vol % porosity for the total volume of the body, such as at least 17 vol % or at least or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % for a total volume of the body. Still, in other non-limiting embodiment, the body may include a porosity of at most 65 vol % for the total volume of the body or at most 63 vol % or at most 60 vol % or at most 59 vol % or at most 58 vol % or at most 57 vol % or at most 56 vol % or at most 55 vol % or at most 54 vol % or at most 53 vol % or at most 52 vol % or at most 51 vol % or at most 50 vol % or at most 49 vol % or at most 48 vol % or at most 47 vol % or at most 46 vol % or at most 45 vol % or at most 44 vol % or at most 43 vol % or at most 42 vol % or at most 40 vol % or at most 39 vol % or at most 38 vol % or at most 37 vol % or at most 36 vol % or at most 35 vol % for a total volume of the body. It will be appreciated that the body can include a content of porosity within a range including any of the minimum and maximum percentages noted above.

The bonded abrasive body of the embodiments herein may have a particular porosity that can facilitate improved performance of the abrasive article. For example, the body may include porosity, wherein at least 20% of the total porosity of the body can be interconnected porosity. Interconnected porosity defines a series of interconnected channels extending through the body. Interconnected porosity may also be referred to herein as open porosity. Open porosity or interconnected porosity can be distinct from closed porosity, which is defined as discrete pores within the body that are not connected to adjacent pores and do not form an interconnected network of channels through the body. Closed porosity does not allow a fluid to flow freely through the volume of the body. In another instance, the body can include at least 30%, such as at least 40%, at least 50%, at least 60%, at least 70%, at least 80%, at least 90%, or even at least 95% interconnected porosity for the total volume or porosity in the body. In at least one embodiment, essentially all the porosity of the body can be interconnected porosity. Still, in at least one non-limiting embodiment, the body can have at most 99%, such as at most 95%, or even at most 90% of the total porosity may be interconnected porosity. It will be appreciated that the body can include a content of interconnected porosity within a range including any of the minimum and maximum values noted above.

In still another instance, the body may include a certain content of abrasive particles, which may facilitate improved performance of the abrasive article. For example, the body may include at least 30 vol % abrasive particles for a total volume of the body, such as at least 31 vol % or at least 32 vol % or at least or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % for a total volume of the body for a total volume of the body. Still, in one non-limiting embodiment, the content of abrasive particles in the body can be at most 60 vol % for a total volume of the body, such as at most 59 vol % or at most 58 vol % or at most 57 vol % or at most 56 vol % or at most 55 vol % or at most 54 vol % or at most 53 vol % or at most 52 vol % or at most 51 vol % or at most 50 vol % or at most 49 vol % or at most 48 vol % or at most 47 vol % or at most 46 vol % or at most 45 vol % or at most 44 vol % or at most 43 vol % or at most 42 vol % or at most 41 vol % or at most 40 vol % or at most 39 vol % or at most 38 vol % or at most 37 vol % or at most 36 vol % or at most 35 vol % for a total volume of the body. It will be appreciated that the content of the abrasive particles within the body can be within range including any of the minimum and maximum percentages noted above.

In an embodiment, the bonded abrasive body can have a certain modulus of rupture (MOR), such as at least 20 MPa or at least 30 MPa or at least 32 MPa or at least 35 MPa or at least 38 MPa or at least 40 MPa or at least 42 MPa or at least 43 MPa or at least 44 MPa. In another embodiment, the MOR can be at most 60 MPa, such as at most 55 MPa, at most 52 MPa, at most 49 MPa, at most 48 MPa, or at most 47 MPa. The MOR of the body may be affected by the content of the bond material. For instance, the body can have a relatively higher MOR when the body includes a relatively higher content of the bond material. It will be appreciated that the MOR can be in a range including any of the minimum and maximum values disclosed herein. MOR can be measured using a standard 4-point bending test on a sample of size 4"×1"×0.5", where the load is applied across the 1"×0.5" plane, generally in accordance with ASTM D790, with the exception of the sample size. The failure load can be recorded and calculated back to MOR using standard equations.

In an embodiment, the bonded abrasive body can have a certain modulus of elasticity (MOE), such as at least 20 GPa or at least 22 GPa or at least 25 GPa or at least 30 GPa or at least 33 GPa or at least 35 GPa or at least 37 GPa or at least 40 GPa or at least 41 GPa or at least 42 GPa or at least 43 GPa or at least 45 GPa or at least 47 GPa or at least 49 GPa or at least 51 GPa or at least 53 GPa or at least 55 GPa. In another embodiment, the MOE can be at most 62 GPa or at most 60 GPa or at most 58 GPa or at most 56 GPa or at most 54 GPa or at most 52 GPa or at most 50 GPa or at most 47 GPa or at most 46 GPa or at most 45 GPa or at most 42 GPa or at most 40 GPa or at most 35 GPa. The MOE of the body may be affected by the content of the bond material. For instance, the body can have a relatively higher MOE when the body includes a relatively higher content of the bond material. It will be appreciated that the MOE can be in a range including any of the minimum and maximum values given above. MOE can be calculated through measurement of natural frequency of the composites using a GrindoSonic instrument or similar equipment, as per standard practices in the abrasive grinding wheel industry. In another embodiment, the bonded abrasive body can have a certain MOE, which can correspond to a certain MOR. For example, the bonded abrasive body can have an MOE of at most 47 GPa for a MOR of at least 43 MPa. In another instance, the bonded abrasive body can have an MOE of at most 45 GPa for a MOR of at least 46 MPa.

In one embodiment, the bonded abrasive body can have a ratio of the MOR to MOE. In particular instances, the ratio (MOR/MOE) can be at least 0.8, such as at least 0.9, at least 1.0, at least 1.05, at least 1.10. Still, the ratio (MOR/MOE) may be at most 3.00, such as at most 2.50, at most 2.00, at most 1.70, at most 1.50, at most 1.40, or at most 1.30. It will be appreciated that the ratio (MOR/MOE) of the bonded abrasive bodies can be within a range between any of the minimum and maximum values noted herein.

Notably, the abrasive articles can be suitable for various applications. In accordance with an embodiment, the abrasive article can have a versatility factor as measured according to the versatility test disclosed herein. As used herein, the versatility factor is intended to refer to capability of an abrasive article to perform well in various grinding conditions as outlined in the description of the versatility test. The versatility test is performed as follows.

Workpieces made of tool steel, chrome steel, and carbon steel, respectively, are used for the test. A Heald grinder spindle is used with spindle power set at 13 Hp. TRIM® VHP® E812 is used as the coolant. The wheel speed of 11780 SFPM used. The abrasive article is tested on all the workpieces at the material removal rate $Q'_W$ of 0.3 and 1.1 in$^3$/in/min. Each workpiece is ground for 1 to 10 passes at each removal rate $Q'_W$, and power draw is recorded for each pass. As used herein, $Q'_W$ is determined by the equation of $Q'_W=(V_W \times a_e)$, wherein $V_W$ is feed-rate in in/min, and $a_e$ is depth of cut per pass in inch.

The maximum power draw difference between the workpieces for each grind number is added up, the total of which is divided by 10 to obtain the average maximum difference for each removal rate. The versatility factor is the reciprocal of the bigger of the average maximum power draw differences of the two removal rates. The higher the versatility factor, the more versatile the abrasive article.

Figure 3:
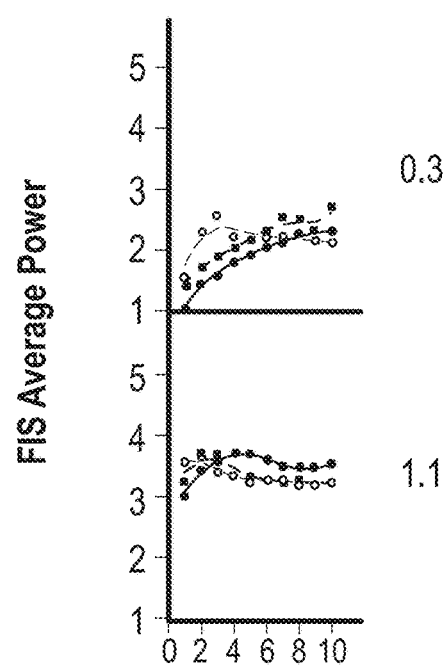
FIG. 3 includes a plot of power draw versus grinding conditions of a representative abrasive article.

FIG. 3 includes an illustration of a plot of power draw versus grinding conditions of a representative grinding wheel tested according to the versatility test. The workpieces were made of tool steel (WP1), carbon steel (WP2), and chrome steel (WP3), respectively. As illustrated, power draw varies when testing conditions change. At the removal rate of 0.3 in$^3$/in/min, the maximum difference at grind number 1 (pass 1) is between WP3 and WP1, while the maximum difference at grind number 6 is between WP2 and WP1. All the maximum differences are added and divided by 10 to obtain the average maximum power draw difference for the removal rate of 0.3 in$^3$/in/min and 1.1 in$^3$/in/min, respectively. As disclosed later in this application, the maximum power draw difference for the rate of 0.3 in$^3$/in/min is 0.468, and for 1.1 in$^3$/in/min 0.331. The versatility factor of the grinding wheel is 1/0.468, which equals 2.137. As used herein, power draw is the average power draw for each tested grind number.

In accordance with an embodiment, the abrasive article can have a versatility factor of at least 1.93, or at least 1.95, or at least 2.00, or at least 2.10. In another embodiment, the abrasive article can have a versatility factor of at most 15, such as at most 13 or at most 10 or at most 9 or at most 8 or at most 7 or at most 6 or at most 5 or at most 4 or at most 3. Moreover, the versatility factor can be within a range including any of the minimum and maximum values disclosed herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

An abrasive article comprising:
a body including:
a bond material extending throughout the body, wherein the bond material comprises greater than 23 wt % aluminum oxide ($Al_2O_3$) for a total weight of the bond material and at least 0.1 wt % and less than 2 wt % of lithium oxide for a total weight of the bond material; and abrasive particles contained within the bond material.

Embodiment 2

An abrasive article comprising:
a body including:
a bond material extending throughout the body, wherein the bond material comprises aluminum oxide and lithium oxide, wherein a ratio ($Al_2O_3/Li_2O$), based on weight percent, is greater than 11.5 and at most 20; and abrasive particles contained within the bond material.

Embodiment 3

An abrasive article comprising:
a body including:
a bond material extending throughout the body, wherein the bond material comprises a vitreous material:
abrasive particles contained within the bond material;
wherein the abrasive article comprises a versatility factor of greater than 1.9.

Embodiment 4

The abrasive article of any one of the preceding embodiments, wherein the abrasive particles comprise greater than 23 wt % of aluminum oxide ($Al_2O_3$) for a total weight of the bond material or at least 23.1 wt % or at least 23.3 wt % or at least 23.4 wt % at least 23.6 wt % for a total weight of the bond material.

Embodiment 5

The abrasive article of any one of the preceding embodiments, wherein the bond material comprises at most 40 wt % of aluminum oxide ($Al_2O_3$) for a total weight of the bond material.

Embodiment 6

The abrasive article of any one of the preceding embodiments, wherein the bond material comprises lithium oxide ($Li_2O$) of lithium oxide ($Li_2O$) of at most 3.5 wt % for the total weight of the bond material or at most 3.4 wt % or at most 3.3 wt % or at most 3.1 wt % or at most 2.9 wt % or at most 2.6 wt % or at most 2.3 wt % or at most 2 wt % or at most 1.7 wt % for a total weight of the bond material.

Embodiment 7

The abrasive article of any one of the preceding embodiments, wherein the bond material comprises lithium oxide ($Li_2O$) of at least 0.2 wt % for the total weight of the bond material or at least 0.3 wt % or at least 0.5 wt % or at least 0.6 wt % or at least 0.8 wt % or at least 0.9 wt % or at least 1.1 wt % or at least 1.2 wt % or at least 1.4 wt % or at least 1.7 wt % for a total weight of the bond material.

Embodiment 8

The abrasive article of any one of the preceding embodiments, wherein the bond material comprises a ratio ($Al_2O_3/Li_2O$), based on weight percent, of greater than 11.5 or at least 11.7 or at least 11.9 or at least 12.1 or at least 12.4 or at least 12.5 or at least 12.8 or at least 13.1 or at least 13.3 or at least 13.5 or at least 13.7 or at least 13.8 or at least 13.9 or at least 14.1 or at least 14.2 or at least 14.5 or at least 14.7 or at least 14.9 or at least 15.1 or at least 15.3 or at least 15.5 or at least 15.7 or at least 15.9 or at least 16.1 or at least 16.3 or at least 16.5 or at least 16.8 or at least 17.1 or at least 17.3 or at least 18.5 or at least 18.7 or at least 18.9.

Embodiment 9

The abrasive article of any one of the preceding embodiments, wherein the bond material comprises a ratio ($Al_2O_3/Li_2O$) based on weight percent of at most 20.0 or at most 19.5 or at most 19.3 or at most 19.1 or at most 18.7 or at most 18.4 or at most 18.2 or at most 17.8 or at most 17.4 or at most 17.0 or at most 16.5 or at most 16.2 or at most 16.0 or at most 15.8 or at most 15.5 or at most 15.2 or at most 14.8 or at most 14.4 or at most 14.1 or at most 14.0 or at most 13.8.

Embodiment 10

The abrasive article of any one of the preceding embodiments, wherein the bond material further comprises boron oxide ($B_2O_3$) and the bond material comprises a ratio ($Al_2O_3/B_2O_3$), based on weight percent, of at least 1.2 or at least 1.3 or at least 1.4 or at least 1.5 or at least 1.6.

Embodiment 11

The abrasive article of any one of the preceding embodiments, wherein the bond material further comprises boron oxide ($B_2O_3$) and the bond material comprises a ratio ($Al_2O_3/B_2O_3$), based on weight percent, of at most 2.0 or at most 1.9 or at most 1.8 or at most 1.7.

Embodiment 12

The abrasive article of any one of the preceding embodiments, wherein the bond material further comprises silicon dioxide ($SiO_2$) and the bond material comprises a ratio ($Al_2O_3/SiO_2$), based on weight percent, of at least 0.36 or at least 0.38 or at least 0.39 or at least 0.40 or at least 0.41 or at least 0.43 or at least 0.45 or at least 0.47 or at least 0.48 or at least 0.49.

Embodiment 13

The abrasive article of any one of the preceding embodiments, wherein the bond material further comprises silicon dioxide ($SiO_2$) and the bond material comprises a ratio ($Al_2O_3/SiO_2$), based on weight percent, of at most 1 or at most 0.65 or at most 0.63 or at most 0.61 or at most 0.59 or at most 0.57 or at most 0.54 or at most 0.52 or at most 0.51.

Embodiment 14

The abrasive article of any one of the preceding embodiments, wherein the bond material comprises at least 9 wt % boron oxide ($B_2O_3$) for a total weight of the bond material or at least 10 wt % or at least 11 wt % or at least 12 wt % or at least 13 wt % or at least 14 wt % for a total weight of the bond material.

Embodiment 15

The abrasive article of any one of the preceding embodiments, wherein the bond material comprises at most 31 wt % boron oxide ($B_2O_3$) for a total weight of the bond material or at most 30 wt % or at most 29 wt % or at most 28 wt % or at most 27 wt % or at most 26 wt % or at most 25 wt % or at most 23 wt % or at most 22 wt % or at most 21 wt % or at most 20 wt % or at most 19 wt % or at most 18 wt % or at most 17 wt % or at most 16 wt % or at most 15 wt % for a total weight of the bond material.

Embodiment 16

The abrasive article of any one of the preceding embodiments, wherein the bond material further comprises silicon dioxide ($SiO_2$) and the bond material comprises a ratio ($B_2O_3/SiO_2$), based on weight percent, of at most 0.8 or at most 0.7 or at most 0.6 or at most 0.5 or at most 0.4 or at most 0.3.

Embodiment 17

The abrasive article of any one of the preceding embodiments, wherein the bond material further comprises silicon dioxide ($SiO_2$) and the bond material comprises a ratio ($B_2O_3/SiO_2$), based on weight percent, of at least 0.10 or at least 0.13 or at least 0.15 or at least 0.16 or at least 0.17 or at least 0.19 or at least 0.20 or at least 0.22 or at least 0.24 or at least 0.25 or at least 0.26 or at least 0.28 or at least 0.29 or at least 0.3.

Embodiment 18

The abrasive article of any one of the preceding embodiments, wherein the bond material comprises at least 35 wt % silicon dioxide ($SiO_2$) for a total weight of the bond material or at least 38 wt % or at least 41 wt % or at least 42 wt % or at least 44 wt % or at least 45 wt % or at least 46 wt % or at least 47 wt % for a total weight of the bond material.

Embodiment 19

The abrasive article of any one of the preceding embodiments, wherein the bond material comprises at most 65 wt % silicon dioxide ($SiO_2$) for a total weight of the bond material or at most 64 wt % or at most 61 wt % or at most 59 wt % or at most 57 wt % or at most 54 wt % or at most 53 wt % or at most 51 wt % or at most 49 wt % or at most 48 wt % for a total weight of the bond material.

Embodiment 20

The abrasive article of any one of the preceding embodiments, wherein the bond material is essentially free of zircon ($ZrSiO_4$).

Embodiment 21

The abrasive article of any one of embodiments 1, 2 and 3, wherein the bond material comprises at most 2 wt % for the total weight of the bond material of any one of the components selected from the group consisting of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), and titanium dioxide ($TiO_2$), or at most 1 wt % or at most 0.5 wt %.

Embodiment 22

The abrasive article of any one of the preceding embodiments, wherein the bond material is essentially free of at least one component selected from the group consisting of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), and titanium dioxide ($TiO_2$).

Embodiment 23

The abrasive article of any one of embodiments 1, 2 and 3, wherein the bond material is essentially free of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), and titanium dioxide ($TiO_2$).

Embodiment 24

The abrasive article of any one of embodiments 1, 2 and 3, wherein the bond material comprises at most 2 wt % for the total weight of the bond material of the sum of components of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), and titanium dioxide ($TiO_2$).

Embodiment 25

The abrasive article of any one of the preceding embodiments, wherein the bond material comprises at least 0.5 wt % sodium oxide ($Na_2O$) for a total weight of the bond material or at least 1 wt % or at least 2 wt % or at least 3 wt % or at least 4 wt % or at least 5 wt % or at least 6 wt % or at least 7 wt % or at least 8 wt %.

Embodiment 26

The abrasive article of any one of the preceding embodiments, wherein the bond material comprises at most 15 wt % sodium oxide ($Na_2O$) for a total weight of the bond material 14 wt % or at most 13 wt % or at most 12 wt % or at most 11 wt % or at most 10 wt % or at most 9 wt % or at most 8.5 wt % for the total weight of the bond material.

Embodiment 27

The abrasive article of any one of the preceding embodiments, wherein the bond material comprises an amorphous phase.

Embodiment 28

The abrasive article of any one of the preceding embodiments, wherein the bond material is free of a crystalline phase.

Embodiment 29

The abrasive article of any one of the preceding embodiments, wherein the bond material comprises at least 0.3 wt % potassium oxide ($K_2O$) for a total weight of the bond material or at least 0.5 wt % or at least 0.8 wt % or at least 1.2 wt % or at least 1.7 wt % or at least 2.0 wt % or at least 2.5 wt %.

Embodiment 30

The abrasive article of any one of the preceding embodiments, wherein the bond material comprises at most 7.5 wt % potassium oxide ($K_2O$) for a total weight of the bond material or at most 7.0 wt % or at most 6.5 wt % or at most 6.0 wt % or at most 5.5 wt % or at most 5.0 wt % or at most 4.5 wt % or at most 4 wt % or at most 3.5 wt % or at most 3.0 wt % for the total weight of the bond material.

Embodiment 31

The abrasive article of any one of the preceding embodiments, wherein the body comprises at least 3 vol % bond material for a total volume of the body or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % for a total volume of the body.

Embodiment 32

The abrasive article of any one of the preceding embodiments, wherein the body comprises at most 20 vol % bond material for a total volume of the body or at most 19 vol % or at most 18 vol % or at most 17 vol % or at most 16 vol % or at most 15 vol % or at most 14 vol % or at most 13 vol % or at most 12 vol % or at most 11 vol % or at most 10 vol % or at most 9 vol % or at most 8 vol % or at most 7 vol % or at most 6 vol % or at most 5 vol % or at most 4 vol % for a total volume of the body.

Embodiment 33

The abrasive article of any one of the preceding embodiments, wherein the body comprises porosity within the body present in an amount of at least 12 vol % and at most 65 vol % for a total volume of the body.

Embodiment 34

The abrasive article of any one of the preceding embodiments, wherein body comprises porosity of at least 13 vol % for the total volume of the body or at least 14 vol % at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % for a total volume of the body.

Embodiment 35

The abrasive article of any one of the preceding embodiments, wherein the body comprises porosity of at most 63 vol % for the total volume of the body or at most 62 vol % or at most 60 vol % or at most 59 vol % or at most 57 vol % or at most 56 vol % or at most 54 vol % or at most 52 vol % or at most 51 vol % or at most 50 vol % or at most 49 vol % or at most 48 vol % or at most 47 vol % or at most 46 vol % or at most 45 vol % or at most 44 vol % or at most 42 vol % or at most 40 vol % or at most 39 vol % or at most 38 vol % or at most 37 vol % or at most 36 vol % or at most 35 vol % or at most 34 vol % or at most 33 vol % or at most 31 vol % or at most 30 vol % or at most 29 vol % or at most 28 vol % or at most 27 vol % or at most 26 vol % or at most 25 vol % or at most 24 vol % or at most 23 vol % or at most 22 vol % or at most 21 vol % or at most 20 vol % or at most 19 vol % or at most 18 vol % or at most 17 vol % or at most 16 vol % for a total volume of the body.

Embodiment 36

The abrasive article of any one of the preceding embodiments, wherein the body comprises at least 20 vol % abrasive particles for a total volume of the body or at least 22 vol % or at least or at least 23 vol % or at least 24 vol % or at least 25 vol % or at least 26 vol % or at least 27 vol % or at least 28 vol % or at least 29 vol % or at least 30 vol % or at least 32 vol % or at least or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % for a total volume of the body.

Embodiment 37

The abrasive article of any one of the preceding embodiments, wherein the body comprises at most 60 vol % abrasive particles for a total volume of the body or at most 59 vol % or at most 58 vol % or at most 57 vol % or at most 56 vol % or at most 55 vol % or at most 54 vol % or at most 53 vol % or at most 52 vol % or at most 51 vol % or at most 50 vol % or at most 49 vol % or at most 48 vol % or at most 47 vol % or at most 46 vol % or at most 45 vol % or at most 44 vol % or at most 43 vol % or at most 42 vol % or at most 41 vol % or at most 40 vol % or at most 39 vol % or at most 38 vol % or at most 37 vol % or at most 36 vol % or at most 35 vol % or at most 34 vol % or at most 33 vol % or at most 32 vol % for a total volume of the body.

Embodiment 38

The abrasive article of any one of the preceding embodiments, wherein the bond material comprises at most 3 wt % of phosphorous oxide ($P_2O_5$) for a total weight of the bond material or at most 2 wt % or at most 1 wt %.

Embodiment 39

The abrasive article of any one of the preceding embodiments, wherein the bond material is essentially free of phosphorous oxide ($P_2O_5$).

Embodiment 40

The abrasive article of any one of the preceding embodiments, wherein the abrasive particles comprise agglomerated abrasive particles, unagglomerated particles, or a combination thereof.

Embodiment 41

The abrasive article of any one of the preceding embodiments, wherein the abrasive particles comprise microcrystalline aluminum oxide ($Al_2O_3$).

Embodiment 42

The abrasive article of any one of the preceding embodiments, wherein the abrasive particles consist essentially of abrasive particles including microcrystalline aluminum oxide ($Al_2O_3$).

Embodiment 43

The abrasive article of any one of the preceding embodiments, wherein the abrasive particles are free of carbides, borides, nitrides, and any combination thereof.

Embodiment 44

The abrasive article of any one of the preceding embodiments, wherein the body comprises a MOE of at most 47 GPa for a MOR of at least 43 MPa.

Embodiment 45

The abrasive article of any one of the preceding embodiments, wherein the body comprises a MOE of at most 45 GPa for a MOR of at least 46 MPa.

Embodiment 46

The abrasive article of any one of the preceding embodiments, wherein the body has a strength ratio (MOR/MOE) of at least 0.80 or at least 0.90 or at least 1.05 and at most 3.00.

Embodiment 47

The abrasive article of any one of the preceding embodiments, wherein the body has a modulus of elasticity of at most 62 GPa or at most 60 GPa or at most 58 GPa or at most 56 GPa or at most 54 GPa or at most 52 GPa or at most 50 GPa or at most 47 GPa or at most 46 GPa or at most 45 GPa and at least 40 GPa.

Embodiment 48

The abrasive article of any one of the preceding embodiments, wherein the body has a modulus of rupture of at least 20 MPa or at least 30 MPa or at least 32 MPa or at least 35 MPa or at least 38 MPa or at least 40 MPa or at least 42 MPa or at least 43 MPa or at least 44 MPa.

Embodiment 49

The abrasive article of any one of the preceding embodiments, wherein the bond material has a forming temperature of at most 950° C. or at most 945° C. or at most 935° C. or at most 930° C. or at most 925° C. or at most 920° C.

The abrasive article of any one of the preceding embodiments, wherein when the body comprises at least 3 vol % and less than 9 vol % of the bond material, the body comprises at least 110 bond bridges; when the body comprises at least 9 vol % and less than 14 vol % of the bond material, the body comprises at least 140 bond bridges; or when the body comprises at least 14 vol % of the bond material, the body comprises at least 135 bond bridges.

Example 1

Representative (S1) and conventional (C1) grinding wheels were formed having the bond compositions included in Table 1 and 2, respectively. Contents of BaO, $MnO_2$, $ZrO_2$, and ZnO were expected to be low and not tested, but it should be understood the sum of all the components totals 100%. The contents of the components are relative to the total weight of the bond material.

The mixtures including the bond precursor material and white alumina abrasive particles were casted into a mold having dimensions of 7 inches×0.5 inches×1.25 inches to form green bodies of samples S1 and C1. The green bodies were kept in the molds and heat treated at approximately 900° C. for 8 hours in air to form finally-formed abrasive bodies.

Each of samples S1 and C1 included 10.26 vol % of the bond materials, 41.74 vol % of porosity, and 48 vol % of nanocrystalline alumina abrasive particles with respect to the total volume of the body of the wheel.

TABLE 1

| | | $Li_2O$ (wt %) | $B_2O_3$ (wt %) | $Na_2O$ (wt %) | MgO (wt %) | $Al_2O_3$ (wt %) | $SiO_2$ (wt %) | $K_2O$ (wt %) | CaO (wt %) | $TiO_2$ (wt %) | $Fe_2O_3$ (wt %) |
|---|---|---|---|---|---|---|---|---|---|---|---|
| | After firing | 1.44 | 11.92 | 8.16 | 0.32 | 36.01 | 37.44 | 2.89 | 1.07 | 0.22 | 0.46 |

Bond Composition of S1 Sample

TABLE 2

| | Li$_2$O (wt %) | B$_2$O$_3$ (wt %) | Na$_2$O (wt %) | MgO (wt %) | Al$_2$O$_3$ (wt %) | SiO$_2$ (wt %) | K$_2$O (wt %) | CaO (wt %) | TiO$_2$ (wt %) | Fe$_2$O$_3$ (wt %) |
|---|---|---|---|---|---|---|---|---|---|---|
| | Bond Composition of C1Sample | | | | | | | | | |
| After firing | 3.06 | 13.91 | 8.50 | 0.52 | 32.51 | 37.79 | 2.53 | 0.86 | 0.05 | 0.24 |

Figure 5:
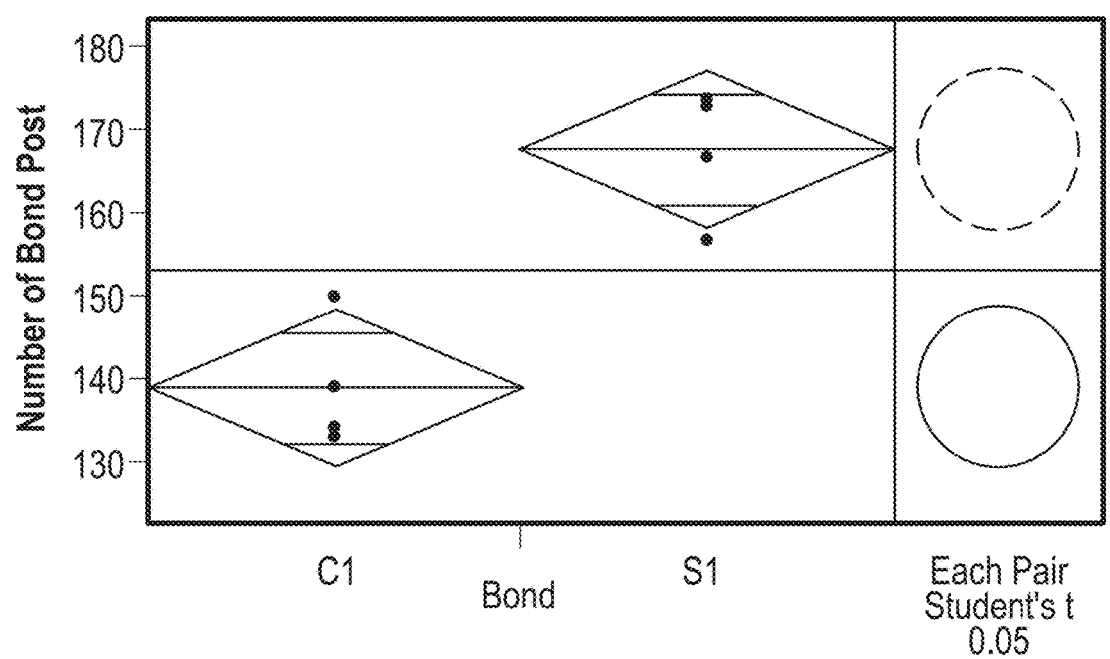
FIG. 5 includes a comparison graph of number of bond bridges between different abrasive articles.

FIG. 4 includes images of cross sections of the bodies of C1 and S1 under the magnification of 30×. As demonstrated, bond bridges are black. Abrasive particles and pores are not visible. At least 4 cross-sectional SEM images of were analyzed using ImageJ as described in embodiments of this disclosure. As noted in Table 3 below and FIG. 5, S1 had significantly more bond bridges in average than C1, and thus, an improved microstructure over C1.

Figure 6:
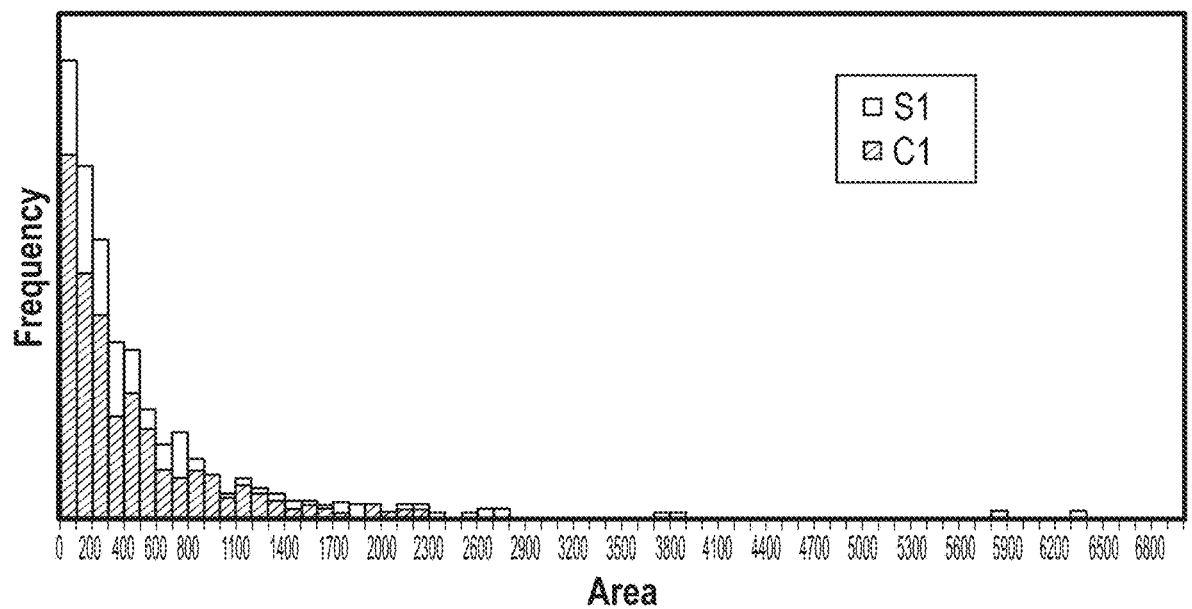
FIG. 6 includes a histogram illustrating distribution of bond bridges of different abrasive articles.

FIG. 6 includes a graph illustrating the distribution of bond bridges of S1 vs. C1. As illustrated, wheels S1 had higher number of smaller bridges compared to C1.

TABLE 3

| Number of Bond Bridges | | |
|---|---|---|
| Sample | Number of Bond Bridges | Average |
| C1 | 133 | 139.0 |
| | 134 | |
| | 150 | |
| | 139 | |
| S1 | 173 | 167.8 |
| | 174 | |
| | 157 | |
| | 167 | |

Example 2

Additional representative (S2) and conventional (C2) grinding wheels were formed in the same manner as described in Example 1 and having the same bond compositions as S1 and C1, respectively, and the same abrasive particles. Each of the wheels S2 and C2 included 8.11 vol % of the bond materials, 43.89 vol % of porosity, and 48 vol % of nanocrystalline alumina abrasive particles for the total volume of the body of the wheel.

Figure 7:
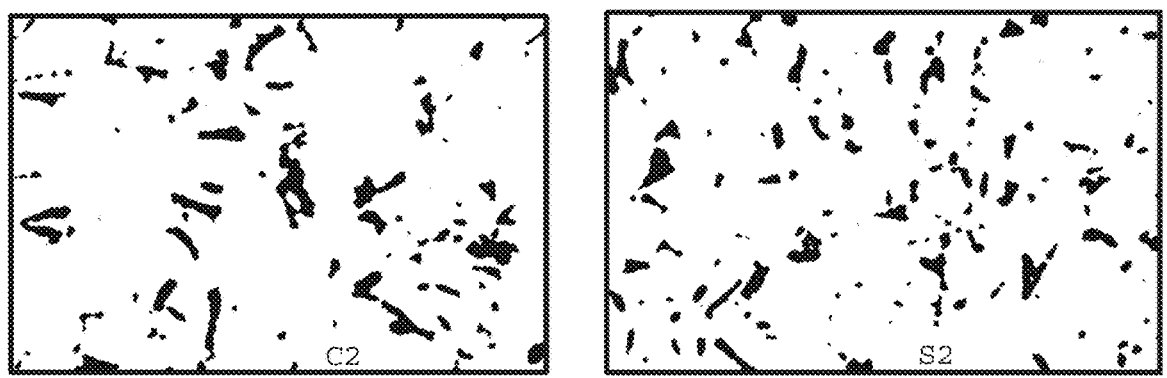
FIG. 7 includes images of cross sections of additional abrasive articles.
Figure 8:
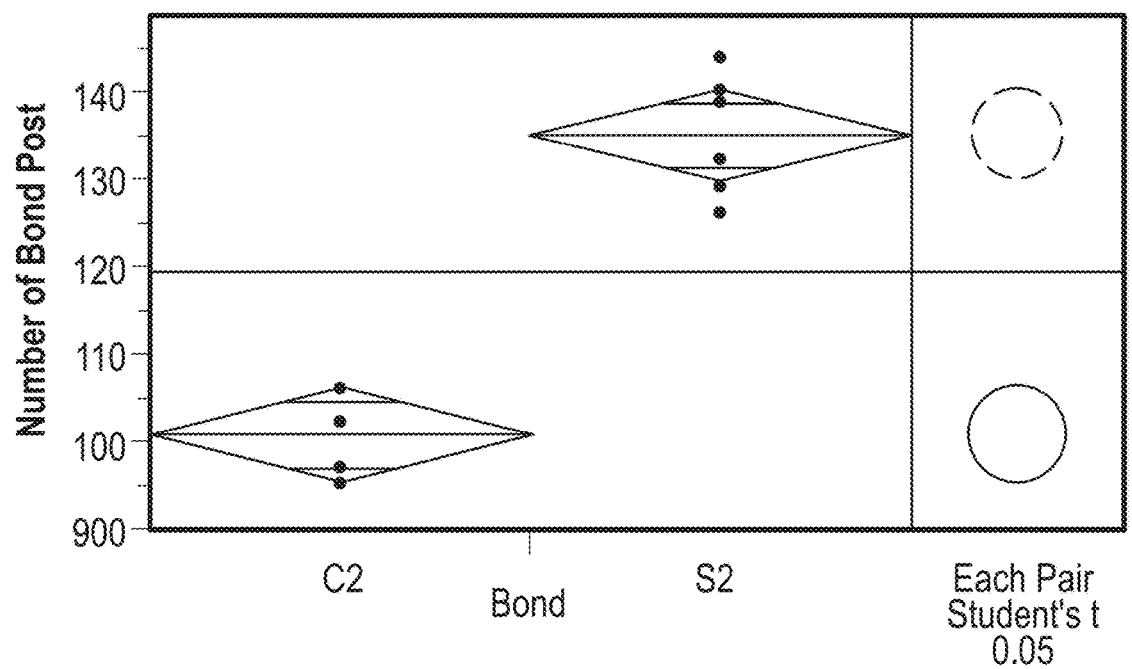
FIG. 8 includes a comparison graph of number of bond bridges between additional abrasive articles.

FIG. 7 includes high-contrasting SEM images of cross sections of the bodies of C2 and S2 wheels. As demonstrated, bond bridges are black, and abrasive particles and pores are not visible, as they are white. The number of the bond bridges was determined in the same manner as described in Example 1 except images of 6 cross sections were analyzed for the average number of bond bridges. As disclosed in Table 4 below and FIG. 8, S2 had significantly higher number of bond bridges than C2, indicating S2 had an improved microstructure over C2.

TABLE 4

| Number of Bond Bridges | | |
|---|---|---|
| Sample | Number of Bond Bridges | Average |
| C2 | 97 | 100.7 |
| | 95 | |
| | 102 | |
| | 106 | |
| | 102 | |
| | 102 | |
| S2 | 139 | 135.0 |
| | 129 | |
| | 140 | |
| | 126 | |
| | 144 | |
| | 132 | |

Figure 9:
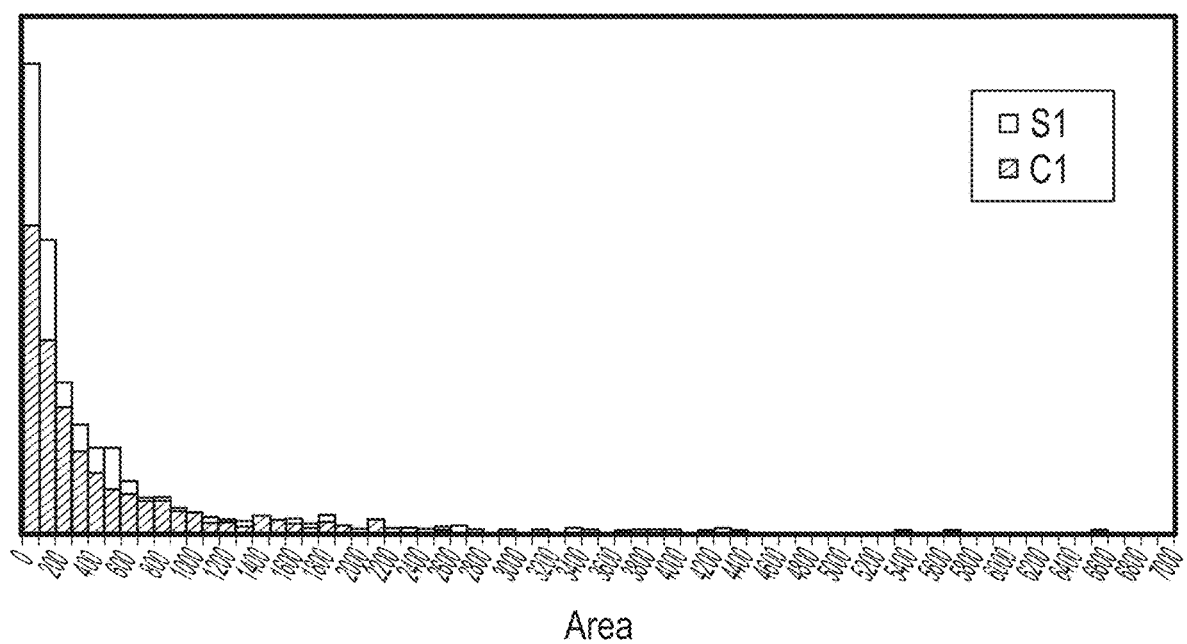
FIG. 9 includes a histogram illustrating distribution of bond bridges of additional abrasive articles.

FIG. 9 includes an illustration of the bond bridge distribution of S2 vs. C2. As illustrated, wheels S2 had higher number of smaller bridges compared to C2.

Example 3

Representative (S3) and conventional (C3 to C8) grinding wheel were formed in the same manner as disclosed in Example 1 and having the compositions included in Table 5 below and white alumina abrasive particles. The contents of the components are in weight percent and relative to the total weight of the bond material.

Each of the wheel samples included for the total volume of the body of the wheel, 10.26 vol % of the bond materials, 41.74 vol % of porosity, and 48 vol % of abrasive particles. OD grinding was tested on wheels S3 and C3 to C8 to determine the versatility of the samples in accordance with embodiments described herein.

TABLE 5

| | Li$_2$O | B$_2$O$_3$ | Na$_2$O | MgO | Al$_2$O$_3$ | SiO$_2$ | K$_2$O | CaO | TiO$_2$ | Fe$_2$O$_3$ | HfO$_2$/P$_2$O$_5$/BaO | ZnO/ZrO$_2$/MnO$_2$ |
|---|---|---|---|---|---|---|---|---|---|---|---|---|
| | Bond Composition of S3 and C3 to C8 | | | | | | | | | | | |
| S3 | 1.44 | 11.92 | 8.16 | 0.32 | 36.01 | 37.44 | 2.89 | 1.07 | 0.22 | 0.46 | 0.02/0.00/0.00 | 0.02/0.03/0.00 |
| C3 | 0.03 | 3.52 | 6.22 | 0.32 | 27.33 | 54.85 | 6.76 | 0.25 | 0.23 | 0.44 | 0.02/0.00/0.00 | 0.01/0.04/0.00 |
| C4 | 0.00 | 7.68 | 6.56 | 2.48 | 28.09 | 44.57 | 7.89 | 1.43 | 0.70 | 0.49 | 0.01/0.00/0.00 | 0.07/0.01/0.00 |
| C5 | 2.67 | 16.08 | 10.32 | 0.08 | 31.11 | 38.38 | 0.40 | 0.24 | 0.46 | 0.24 | 0.02/0.00/0.00 | 0.00/0.01/0.00 |

TABLE 5-continued

Bond Composition of S3 and C3 to C8

| | Li$_2$O | B$_2$O$_3$ | Na$_2$O | MgO | Al$_2$O$_3$ | SiO$_2$ | K$_2$O | CaO | TiO$_2$ | Fe$_2$O$_3$ | HfO$_2$/P$_2$O$_5$/BaO | ZnO/ZrO$_2$/MnO$_2$ |
|---|---|---|---|---|---|---|---|---|---|---|---|---|
| C6 | 3.06 | 13.91 | 8.50 | 0.52 | 32.51 | 37.79 | 2.53 | 0.86 | 0.05 | 0.24 | 0.01/0.00/0.00 | 0.01/0.01/0.00 |
| C7 | 0.03 | 3.00 | 6.48 | 2.38 | 25.25 | 57.05 | 2.87 | 1.85 | 0.52 | 0.56 | 0.00/0.00/0.00 | 0.01/0.00/0.00 |
| C8 | 0.81 | 5.92 | 5.47 | 0.86 | 20.96 | 61.23 | 1.74 | 2.41 | 0.24 | 0.28 | 0.02/0.00/0.00 | 0.02/0.04/0.00 |

Figure 10:
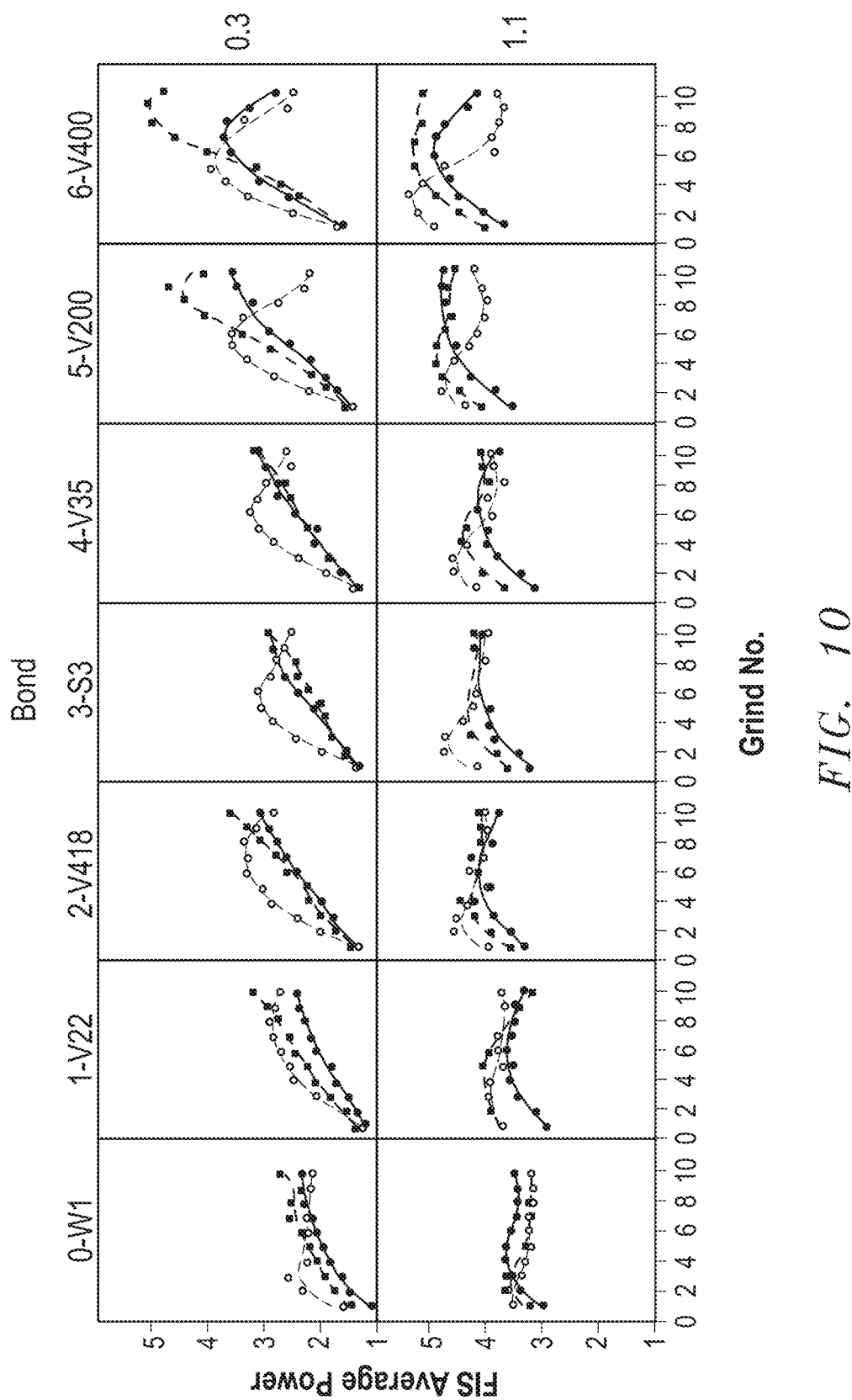
FIG. 10 includes a plot of power draw versus grinding conditions of different abrasive articles.

FIG. 10 includes plot of power draw vs. the number of cuts for each removal rate of the tested samples. Wheels C3 to C8 demonstrated bigger spread of power draw between different workpieces and over the entire range of the cut numbers as compared to S3. The average maximum powder draw difference for each removal rate $Q'_w$ and versatility factors of the wheels are included in Table 6 below.

TABLE 6

Versatility of Wheels

| | Average Maximum Power Draw Differences | | |
|---|---|---|---|
| | $Q'_w$ of 0.3 | $Q'_W$ of 1.1 | Versatility Factor |
| S3 | 0.468 | 0.331 | 2.137 |
| C3 | 0.582 | 0.465 | 1.718 |
| C4 | 0.613 | 0.37 | 1.631 |
| C5 | 0.535 | 0.458 | 1.869 |
| C6 | 0.553 | 0.526 | 1.808 |
| C7 | 1.105 | 0.631 | 0.905 |
| C8 | 1.105 | 1.116 | 0.896 |

Example 4

Additional representative (S9) and conventional (C9) grinding wheels were formed in the same manner as described in Example 1 and having the same bond compositions as S1 and C1, respectively, and the same abrasive particles. Each of the wheels S9 and C9 included 4 vol % to 6 vol % of the bond materials, 46 vol % to 48 vol % of porosity, and 48 vol % of nanocrystalline alumina abrasive particles for the total volume of the body of the wheel. It is to be understood that the total of the contents of bond material, porosity, and abrasive particles makes up 100%, even though a range for bond and porosity is provided.

Figure 11:
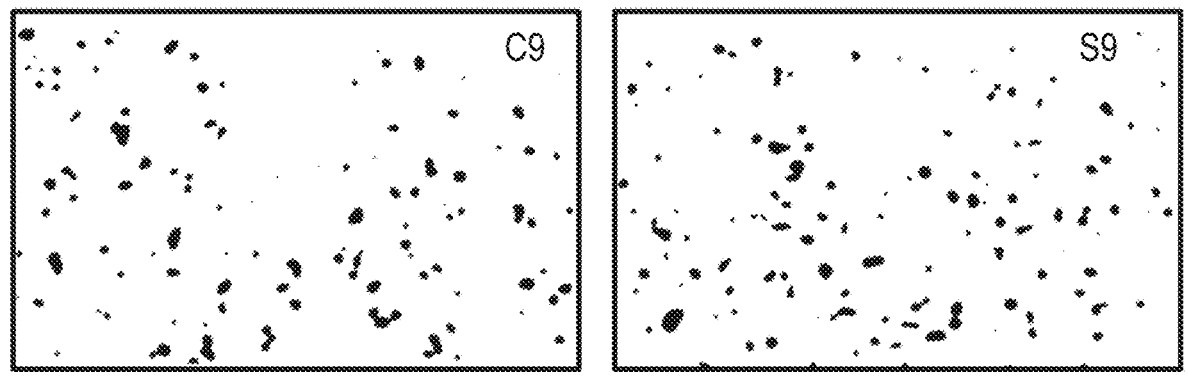
FIG. 11 includes images of cross sections of abrasive articles.
Figure 12:
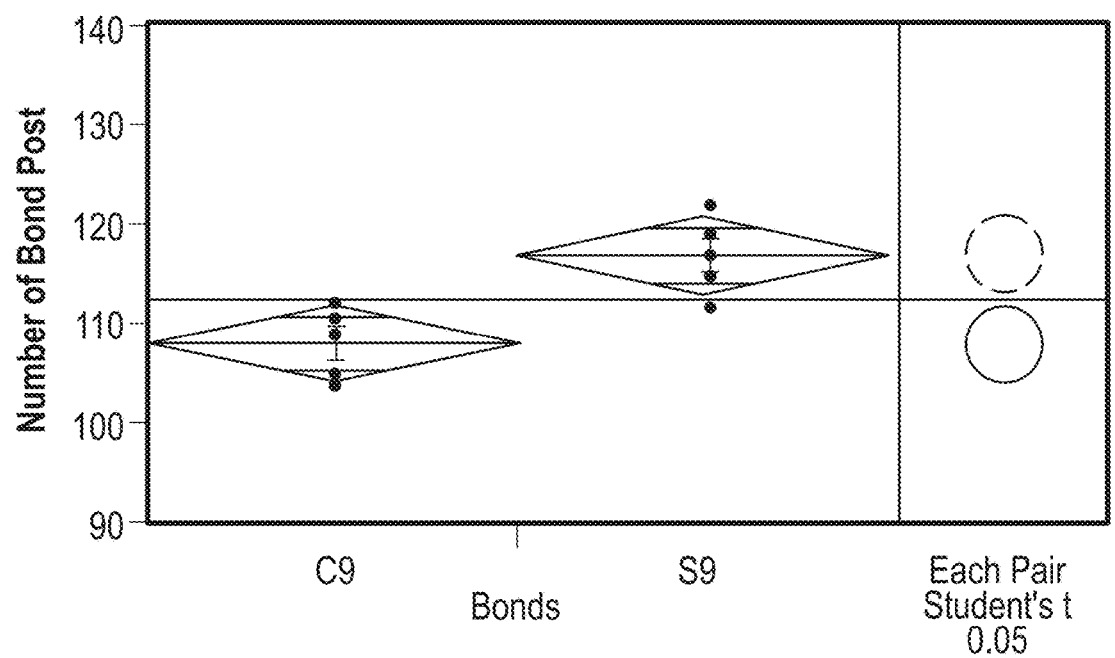
FIG. 12 includes a comparison graph of number of bond bridges between abrasive articles.

FIG. 11 includes high-contrasting SEM images of cross sections of the bodies of C9 and S9 wheels. As demonstrated, bond bridges are black, and abrasive particles and pores are not visible. The number of the bond bridges was determined in the same manner as described in Example 1 except 5 cross-sectional images were analyzed for the average number of bond bridges. As disclosed in FIG. 12, S9 had significantly higher number of bond bridges than C9, indicating S9 had an improved microstructure over C9.

Figure 13:
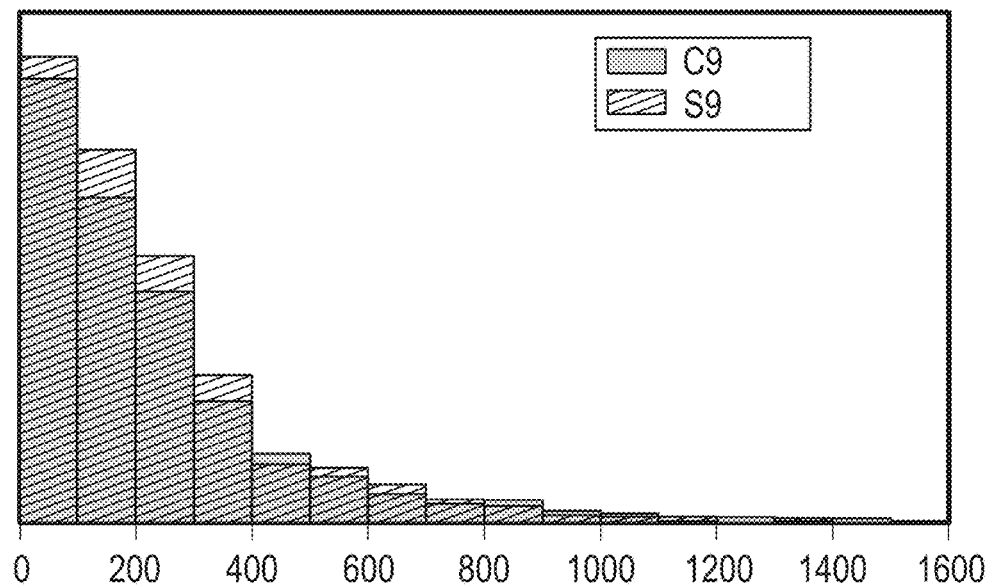
FIG. 13 includes a histogram illustrating distribution of bond bridges of abrasive articles.

FIG. 13 includes a graph illustrating the distribution of bond bridges of S9 vs. C9. As illustrated, wheels S9 had higher number of smaller bridges compared to C9.

Example 5

Additional representative (S10) and conventional (C10) grinding wheels were formed in the same manner as described in Example 1 and having the same bond compositions as S1 and C1, respectively, and the same abrasive particles. Each of the wheels S10 and C10 included 14 vol % of the bond materials, 48 vol % of porosity, and 48 vol % of nanocrystalline alumina abrasive particles for the total volume of the body of the wheel.

Figure 14:
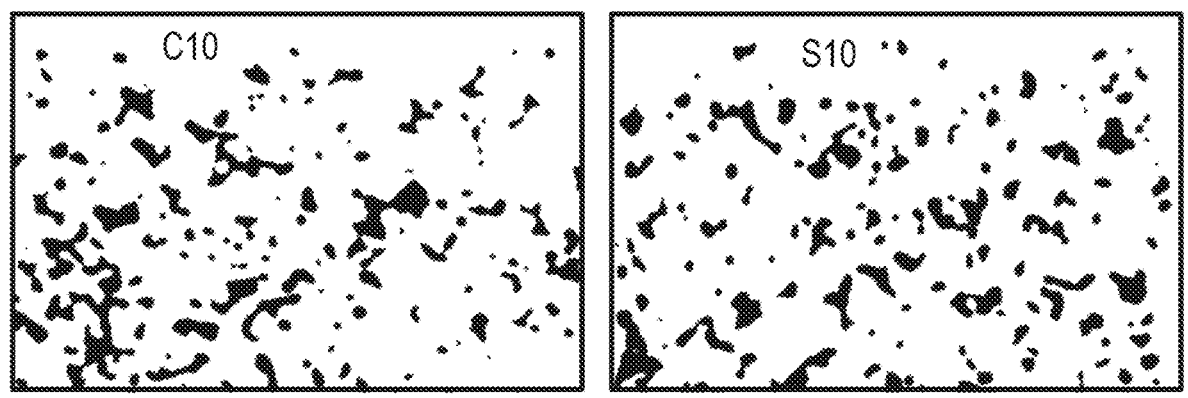
FIG. 14 includes images of cross sections of additional abrasive articles.
Figure 15:
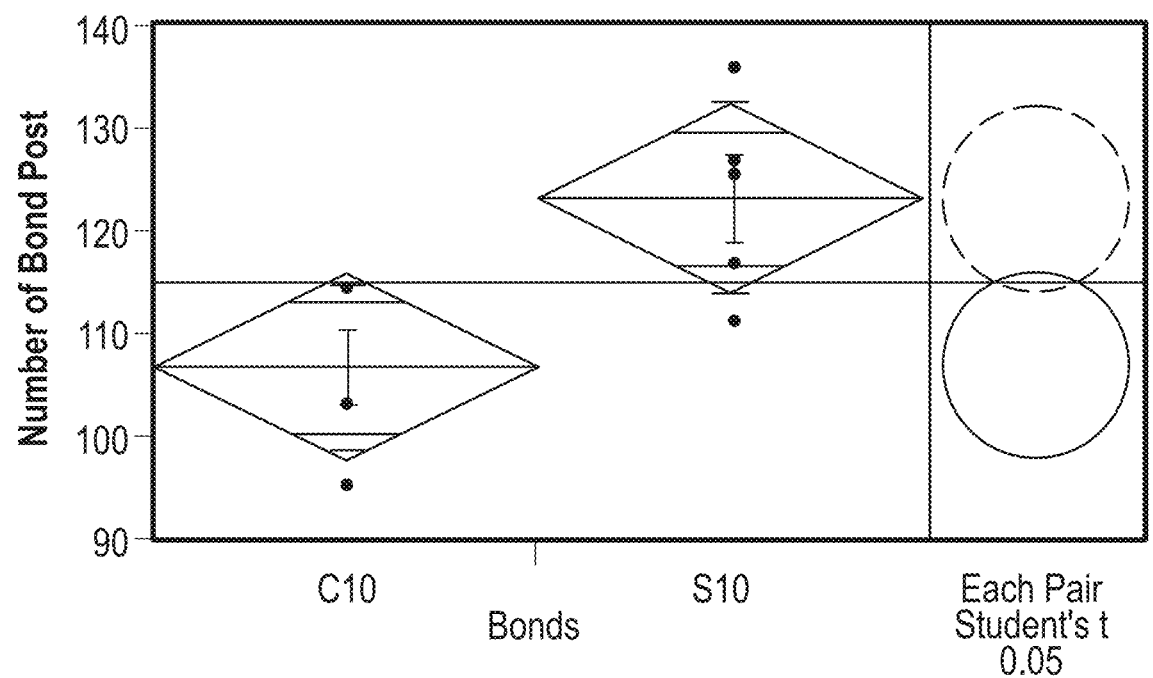
FIG. 15 includes a graph of number of bond bridges of additional abrasive articles.

FIG. 14 includes SEM images of cross sections of the bodies of C10 and S10 wheels. As demonstrated, bond bridges are black, and abrasive particles and pores are not visible. The number of the bond bridges was determined in the same manner as described in Example 1 except 5 cross-sectional images were analyzed for the average number of bond bridges. As disclosed in FIG. 15, S10 had significantly higher number of bond bridges than C10, indicating S10 had an improved microstructure over C10.

Figure 16:
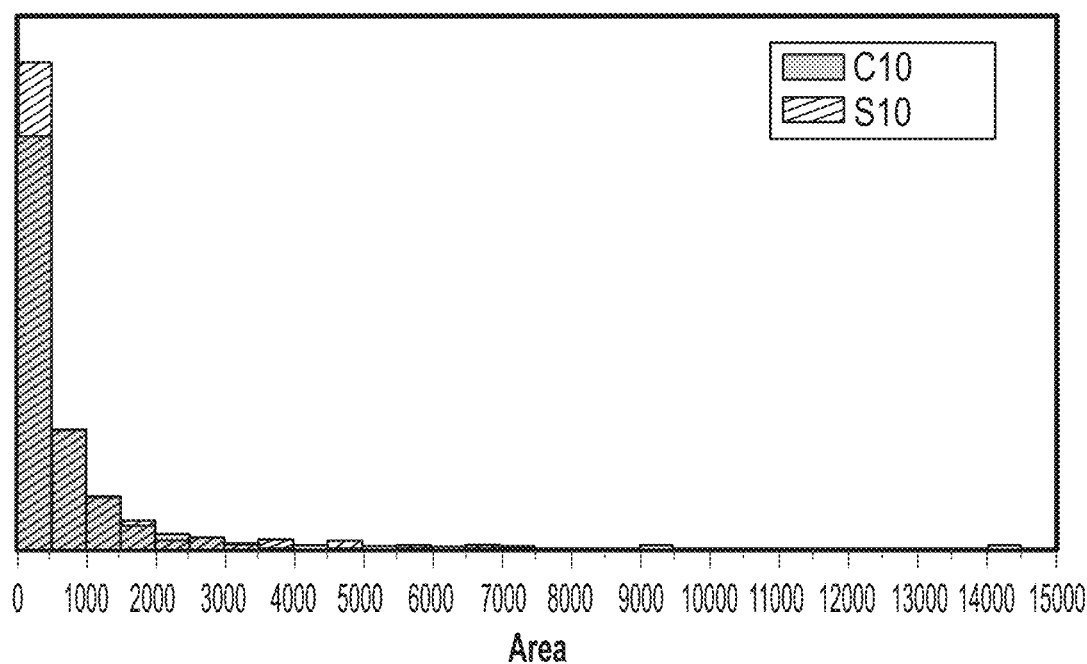
FIG. 16 includes a histogram illustrating distribution of bond bridges of additional abrasive articles.

FIG. 16 includes a graph illustrating the distribution of bond bridges of S10 vs. C10. As illustrated, wheels S10 had higher number of smaller bridges compared to C10.

Example 6

Figure 17A:
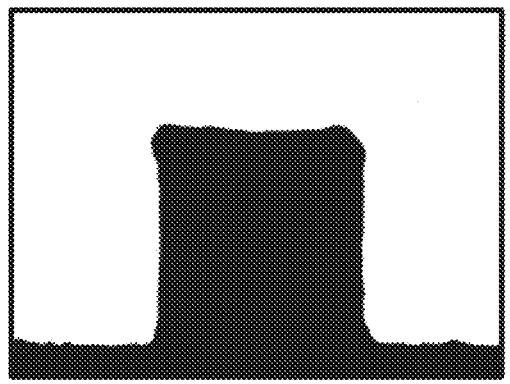
FIGS. 17A to 17D include microscopic images of bond materials.
Figure 17B:
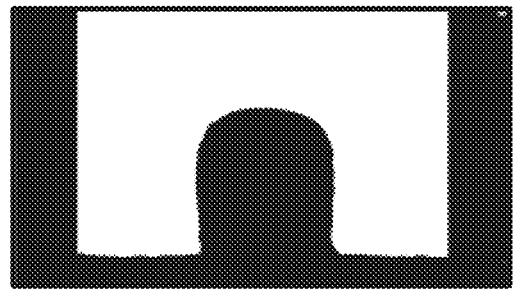
Figure 17C:
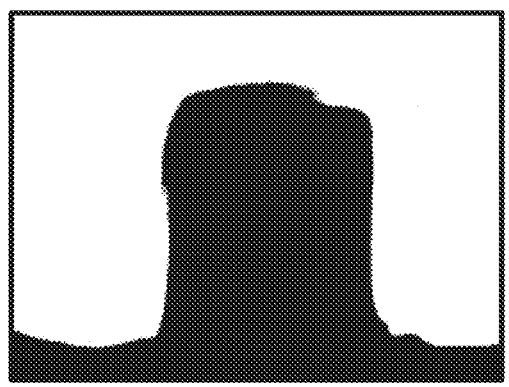
Figure 17D:
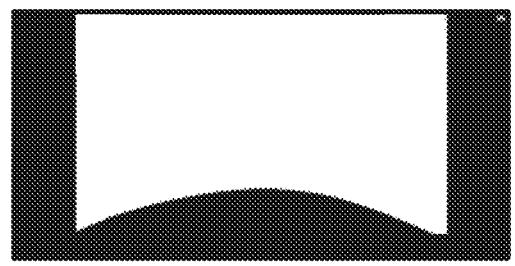
Figure 18:
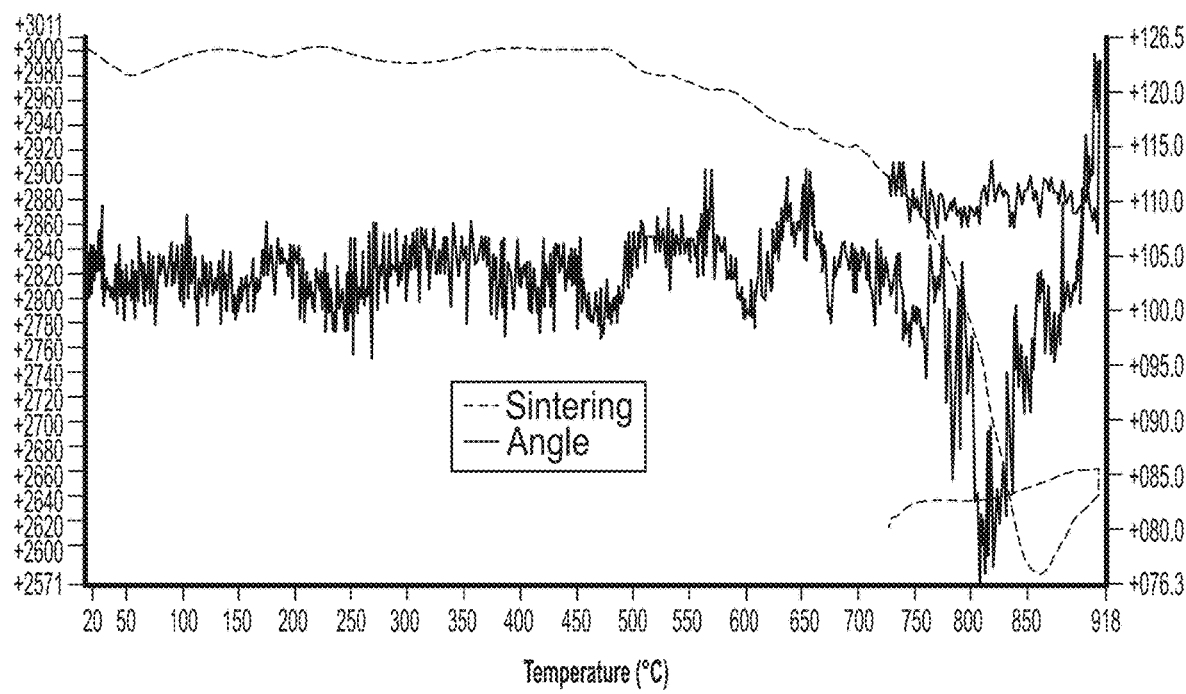
FIG. 18 includes a plot illustrating contacting angles of a bond material with respect to a contacting surface.
Figure 19:
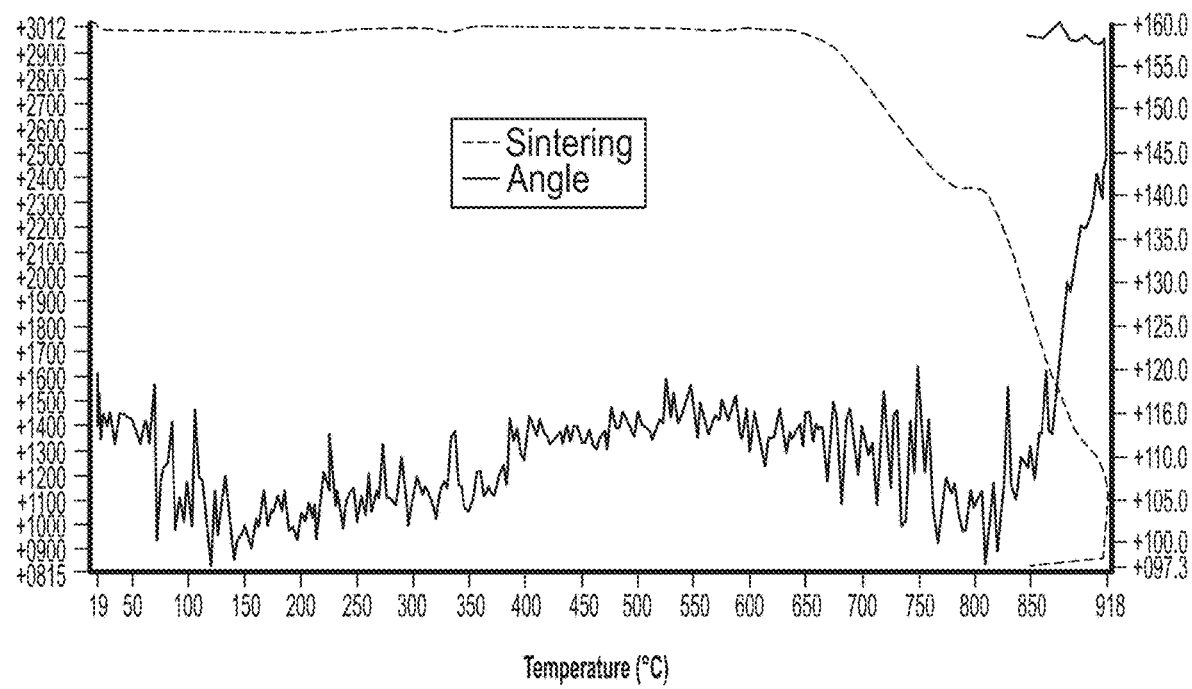
FIG. 19 includes a plot illustrating contacting angles of another bond material with respect to a contacting surface.

Up to about 0.2 g of the bond materials of samples S1 and C1 were placed on an alumina plate, respectively, and tested using Optical Fleximeter Misura® 3 (from Expert System Solutions). FIGS. 17A and 17C illustrate a microscopic image of the bond materials of S1 and C1 on an alumina plate at room temperature, respectively. The bond materials S1 and C1 were heated at about 900° C. for 1 to 2 minutes, and the microscopic images of the heated bond materials S1 and C1 are illustrated in FIGS. 17B and 17D, respectively. The angles formed by the heated bond material with respect to the contacting surface of the alumina plate were recorded and analyzed following the instructions provided with Optical Fleximeter Misura® 3. As demonstrated in FIG. 18, the angles formed between S1 and the contacting surface of the alumina plate is from about 110° to about 115°. As demonstrated in FIG. 19, the angles formed by C1 with respect to the contacting surface of the alumina plate is from about 140° to about 160°.

Example 7

Bar samples having the same compositions as samples C1, S1, C9, S9, C10, and S10, respectively, were formed. At least 3 bars of each composition were tested for MOR and MOE as described in embodiments of this disclosure. Table 7 below includes the test data.

TABLE 7

| Sample compositions | MOE (GPa) | Standard Deviation of MOE | MOR (MPa) | Standard Deviation of MOR |
|---|---|---|---|---|
| C1 | 48.42 | ±0.37 | 52.10 | ±0.11 |
| S1 | 44.88 | ±0.48 | 51.29 | ±1.02 |
| C9 | 26.80 | ±0.20 | 33.31 | ±0.92 |

TABLE 7-continued

| Sample compositions | MOE (GPa) | Standard Deviation of MOE | MOR (MPa) | Standard Deviation of MOR |
|---|---|---|---|---|
| S9 | 23.66 | ±0.59 | 25.11 | ±0.09 |
| C10 | 60.63 | ±0.74 | 50.54 | ±1.85 |
| S10 | 55.05 | ±1.03 | 51.56 | ±2.50 |

The foregoing embodiments are directed to bonded abrasive products, and particularly grinding wheels, which represent a departure from the state-of-the-art. The abrasive articles of the embodiments herein utilize a combination of features that facilitate improved performance over conventional wheels. As described in the present application, the abrasive articles can include a vitrified bond material having a particular weight content ratio of alumina ($Al_2O_3$) to lithium oxide ($Li_2O$), which in combination of the bond composition, allows improved formation and performance in various applications of the abrasive articles. During formation of the abrasive article, the bond material disclosed in embodiments herein demonstrates a higher viscosity and lower flowability, compared to conventional bond materials. As noted in Example 6, the bond material can form a smaller angle with respect to the contacting surface, which can be surfaces of abrasive particles, which allows formation of improved microstructure, such as improved number of bond bridges, bond bridges with smaller areas, and smaller pores. The microstructure, in combination with abrasive particles and filler material, has led to significant and unexpected results in terms of versatility of abrasive articles, allowing the same abrasive articles to perform well in various applications involving different grinding conditions, workpieces, and other parameters that are application-based.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article comprising:
   a body including:
      a bond material extending throughout the body, wherein the bond material comprises for a total weight of the bond material:
         at least 26.5 wt % and at most 40 wt % of aluminum oxide ($Al_2O_3$);
         at least 1.1 wt % and less than 2 wt % of lithium oxide ($Li_2O$);
         at least 1.2 wt % and not greater than 5.5 wt % of potassium oxide ($K_2O$);
         at least 7 wt % and at most 9 wt % of sodium oxide ($Na_2O$);
         at most 2 wt % of any one of the components selected from the group consisting of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), and titanium dioxide ($TiO_2$);
         at least 9 wt % and at most 15 wt % of boron oxide ($B_2O_3$); and
         at least 35 wt % and at most 46 wt % of silicon dioxide ($SiO_2$);
      and
      abrasive particles contained within the bond material,
      wherein the body comprises at least 3 vol % and not greater than 20 vol % of the bond material, at least 33 vol % and at most 55 vol % of a porosity for the total volume of the body; and at least 36 vol % and at most 56 vol % of the abrasive particles for a total volume of the body; and
   wherein:
      when the body comprises at least 3 vol % and less than 9 vol % of the bond material, the body comprises at least 110 bond bridges;
      when the body comprises at least 9 vol % and less than 14 vol % of the bond material, the body comprises at least 140 bond bridges; or
      when the body comprises at least 14 vol % of the bond material, the body comprises at least 135 bond bridges.

2. The abrasive article of claim 1, wherein the bond material comprises a ratio ($Al_2O_3/B_2O_3$) based on weight percent of at least 1.8 and at most 4.

3. The abrasive article of claim 2, wherein the bond material comprises the lithium oxide ($Li_2O$) of at least 0.9 wt % for the total weight of the bond material.

4. The abrasive article of claim 3, wherein the bond material comprises a ratio ($B_2O_3/SiO_2$) based on weight percent of at least 0.2 and at most 0.5.

5. The abrasive article of claim 1, wherein the abrasive article comprises a versatility factor of greater than 1.9.

6. The abrasive article of claim 1, wherein the bond material is essentially free of zircon ($ZrSiO_4$).

7. The abrasive article of claim 1, wherein the bond material comprises an amorphous phase.

8. The abrasive article of claim 1, wherein the bond material is free of a crystalline phase.

9. The abrasive article of claim 2, wherein the abrasive particles comprise aluminum oxide ($Al_2O_3$).

10. An abrasive article comprising:
a body including:
a bond material extending throughout the body, wherein the bond material comprises:
lithium oxide ($Li_2O$) of at least 1.2 wt % and at most 1.7 wt % for a total weight of the bond material;
aluminum oxide ($Al_2O_3$) and lithium oxide, wherein a ratio ($Al_2O_3/Li_2O$), based on weight percent, is at least 15.1;
at least 26.5 wt % and at most 40 wt % of aluminum oxide ($Al_2O_3$) for a total weight of the bond material;
at least 9 wt % and at most 16 wt % of boron oxide ($B_2O_3$) for the total weight of the bond material;
at least 35 wt % and at most 46 wt % of silicon dioxide ($SiO_2$) for the total weight of the bond material; and
at least 2 wt % and at most 3.5 wt % of $K_2O$ for the total weight of the bond material; and
at least 7 wt % and at most 9 wt % of sodium oxide ($Na_2O$);
at most 2 wt % for a total weight of the bond material of any one of the components selected from the group consisting of manganese dioxide ($MnO_2$), magnesium oxide (MgO), calcium oxide (CaO), iron oxide ($Fe_2O_3$), phosphorous oxide ($P_2O_5$), barium oxide (BaO), zinc oxide (ZnO), zirconium oxide ($ZrO_2$), and titanium dioxide ($TiO_2$); and
abrasive particles contained within the bond material, wherein:
when the body comprises at least 3 vol % and less than 9 vol % of the bond material, the body comprises at least 110 bond bridges;
when the body comprises at least 9 vol % and less than 14 vol % of the bond material, the body comprises at least 140 bond bridges; or
when the body comprises at least 14 vol % of the bond material, the body comprises at least 135 bond bridges.

11. The abrasive article of claim 10, wherein the abrasive article comprises a versatility factor of greater than 1.9.

12. The abrasive article of claim 10, wherein the bond material comprises a ratio ($K_2O/Li_2O$), based on weight percent, greater than 0.8:0.9 and at most 7.5:0.9.

13. The abrasive article of claim 10, wherein the bond material comprises lithium oxide ($Li_2O$) of at least 0.9 wt % for the total weight of the bond material.

14. The abrasive article of claim 10, wherein the bond material further comprises boron oxide ($B_2O_3$) and the bond material comprises a ratio ($Al_2O_3/B_2O_3$), based on weight percent, of at least 1.8 and at most 4.

15. The abrasive article of claim 10, wherein the bond material further comprises silicon dioxide ($SiO_2$) and boron oxide ($B_2O_3$), and wherein the bond material comprises a ratio ($B_2O_3/SiO_2$), based on weight percent, of at least 0.18 and at most 0.5.

16. The abrasive article of claim 14, wherein the bond material comprises a ratio ($Al_2O_3/SiO_2$), based on weight percent, of at least 0.6 and at most 4:3.

17. The abrasive article of claim 10, wherein the bond material is free of a crystalline phase.

18. The abrasive article of claim 10, wherein the body comprises at least 9 vol % and not greater than 20 vol % of the bond material for a total volume of the body; at least 30 vol % and at most 55 vol % of a porosity for the total volume of the body; and at least 35 vol % and at most 55 vol % of the abrasive particles for the total volume of the body.

19. The abrasive article of claim 18, wherein the abrasive particles comprise aluminum oxide ($Al_2O_3$), wherein the abrasive particles comprise microcrystalline aluminum oxide ($Al_2O_3$), nanocrystalline aluminum oxide ($Al_2O_3$), or a combination thereof.

* * * * *